(12) United States Patent
Reddy et al.

(10) Patent No.: US 12,503,543 B2
(45) Date of Patent: Dec. 23, 2025

(54) CURABLE PHOTOCHROMIC POLYCARBODIIMIDE COMPOSITIONS

(71) Applicant: Transitions Optical, Ltd., Tuam (IE)

(72) Inventors: Ramaiahgari Reddy, Murrysville, PA (US); Brad S. Veldkamp, Allison Park, PA (US); Anil Kumar, Murrysville, PA (US)

(73) Assignee: Transitions Optical, Ltd., Tuam (IE)

( * ) Notice: Subject to any disclaimer, the term of this patent is extended or adjusted under 35 U.S.C. 154(b) by 853 days.

(21) Appl. No.: 17/788,912

(22) PCT Filed: Dec. 27, 2019

(86) PCT No.: PCT/EP2019/087068
§ 371 (c)(1),
(2) Date: Jun. 24, 2022

(87) PCT Pub. No.: WO2021/129939
PCT Pub. Date: Jul. 1, 2021

(65) Prior Publication Data
US 2023/0054095 A1 Feb. 23, 2023

(51) Int. Cl.
C08G 18/02 (2006.01)
C08G 18/12 (2006.01)
C08G 18/79 (2006.01)
C09J 175/12 (2006.01)

(52) U.S. Cl.
CPC ......... C08G 18/025 (2013.01); C08G 18/022 (2013.01); C08G 18/12 (2013.01); C08G 18/797 (2013.01); C09J 175/12 (2013.01)

(58) Field of Classification Search
None
See application file for complete search history.

(56) References Cited

U.S. PATENT DOCUMENTS

| | | |
|---|---|---|
| 5,645,767 A | 7/1997 | Van Gemert |
| 5,658,501 A | 8/1997 | Kumar et al. |
| 5,962,617 A | 10/1999 | Slagel |
| 6,610,812 B1 | 8/2003 | Wu et al. |
| 6,617,413 B1 | 9/2003 | Bruchmann et al. |
| 7,410,691 B2 | 8/2008 | Blackburn et al. |
| 9,028,728 B2 | 5/2015 | Bancroft et al. |
| 2005/0288431 A1 | 12/2005 | Gindin et al. |
| 2006/0141234 A1* | 6/2006 | Rearick ............ C09D 175/04 524/198 |
| 2011/0217471 A1 | 9/2011 | Schwendeman et al. |
| 2016/0347775 A1 | 12/2016 | Calimente et al. |
| 2020/0239730 A1 | 7/2020 | Martin et al. |

FOREIGN PATENT DOCUMENTS

| | | |
|---|---|---|
| WO | 2011000525 A1 | 1/2011 |
| WO | 2011109386 A1 | 9/2011 |
| WO | 2017180220 A1 | 10/2017 |

OTHER PUBLICATIONS

Carbodilite V02-L2 date sheet, prepared Aug. 13, 2025. (Year: 2025).*

* cited by examiner

*Primary Examiner* — Christopher M Rodd
(74) *Attorney, Agent, or Firm* — The Webb Law Firm

(57) ABSTRACT

The present invention relates to curable photochromic compositions which include a polycarbodiimide, an at least di-functional first carboxylic acid functional material having at least two carboxylic acid groups, an optional second carboxylic acid functional material having at least three carboxylic acid groups, a photochromic compound, and an aprotic organic solvent. The curable photochromic compositions have an equivalents ratio of carbodiimide equivalents of the polycarbodiimide to a total carboxylic acid equivalents of the first and optional second carboxylic acid functional materials of from 0.5:1 to 10:1 when the second carboxylic acid functional material is not present; and from 0.5:1 to 3:1 when the second carboxylic acid functional material is present. The present invention, more particularly, relates to curable photochromic coating compositions, and curable photochromic adhesive compositions.

15 Claims, No Drawings

CURABLE PHOTOCHROMIC POLYCARBODIIMIDE COMPOSITIONS

CROSS-REFERENCE TO RELATED APPLICATION

This application is the United States national phase of International Application No. PCT/EP2019/087068 filed Dec. 27, 2019, the disclosure of which is hereby incorporated by reference in its entirety.

BACKGROUND OF THE INVENTION

Field of the Invention

The present invention relates to curable photochromic compositions, which include a polycarbodiimide, a first carboxylic acid functional material having at least two carboxylic acid groups, an optional second carboxylic acid functional material having at least three carboxylic acid groups, a photochromic compound, and an aprotic organic solvent in which an equivalents ratio of carbodiimide equivalents of the polycarbodiimide to a total carboxylic acid equivalents of the first and optional second carboxylic acid functional materials, is from 0.5:1 to 10:1 when the second carboxylic acid functional material is not present, and is from 0.5:1 to 3:1 when the second carboxylic acid functional material is present.

Description of Related Art

In response to certain wavelengths of electromagnetic radiation (or "actinic radiation"), photochromic compounds, such as indeno-fused naphthopyrans, typically undergo a transformation from one form or state to another form, with each form having a characteristic or distinguishable absorption spectrum associated therewith. Typically, upon exposure to actinic radiation, many photochromic compounds are transformed from a closed-form, which corresponds to an unactivated (or bleached, e.g., substantially colorless) state of the photochromic compound, to an open-form, which corresponds to an activated (or colored) state of the photochromic compound. In the absence of exposure to actinic radiation, such photochromic compounds are reversibly transformed from the activated (or colored) state, back to the unactivated (or bleached) state. Compositions and articles, such as optical lenses, that contain photochromic compounds or have photochromic compounds applied thereto (e.g., in form of a photochromic coating composition) typically display colorless (e.g., clear) and colored states that correspond to the colorless and colored states of the photochromic compounds contained therein or applied thereto.

Photochromic compounds can be used in curable compositions to form, for example, cured layers, such as cured films or sheets that are photochromic. With cured photochromic films, such as cured photochromic coatings, it is typically desirable that they provide a combination of hardness and photochromic performance. Photochromic coatings having increased hardness can be desirable for reasons including, but not limited to, improved scratch resistance and/or improved support of one or more additional layers applied there-over. Generally, the kinetics associated with the reversible transformation of a photochromic compound between a closed-form (unactivated/colorless) and an open-form (activated/colored) is faster in a soft matrix, but slower in a hard matrix (of the cured film in which the photochromic compound resides). Cured photochromic films having a soft matrix typically have reduced hardness, while those having a hard matrix typically have increased hardness.

Photochromic compounds can also be used in curable compositions to form, for example, cured adhesive layers that are photochromic. In addition to photochromic properties, with cured photochromic adhesive layers, it is typically desirable that they provide good adhesion and toughness. Adhesive compositions that include blocked or free isocyanate functional materials can provide adhesive layers having desirable adhesion and toughness. When containing free isocyanate groups, the isocyanate functional components and active hydrogen functional components including a catalyst are typically kept separate from each other in a two-package configuration, and combined prior to application. If not properly mixed and/or timely applied after combination, the properties of the resulting adhesive layer can be compromised. Additionally, exposure to free isocyanates can result in human sensitization thereof. The use of blocked isocyanate materials can allow for a one-package configuration in which the blocked isocyanate functional components, active hydrogen functional components, and catalyst are kept together. With the one-package configuration, cure requires deblocking of the blocking groups, such as alcohols, from the blocked isocyanate groups. The deblocked groups can result in the formation of voids within and/or excessive plastisization of the adhesive matrix, and an adhesive layer having degraded properties.

It would be desirable to develop curable photochromic adhesive compositions that provide cured photochromic adhesive layers having a desirable level of photochromic properties, adhesive properties, and toughness, without the difficulties, such as handling, mixing, and curing, associated with typical adhesive chemistries, such as isocyanate-based chemistries. It would be further desirable to develop curable photochromic compositions that provide cured photochromic coating layers having improved hardness without a reduction in photochromic performance.

SUMMARY OF THE INVENTION

In accordance with the present invention, there is provided a curable photochromic adhesive composition comprising (a) a polycarbodiimide; (b) a carboxylic acid functional material having at least two carboxylic acid groups, and having an acid equivalent weight of greater than or equal to 600 g/mole; (c) a photochromic compound; and (d) an aprotic organic solvent. The curable photochromic adhesive composition has an equivalents ratio of carbodiimide equivalents of the polycarbodiimide to carboxylic acid equivalents of the carboxylic acid functional material, that is from 0.5:1 to 10:1.

In accordance with the present invention, there is further provided a curable photochromic coating composition comprising (a) a polycarbodiimide; (b) a first carboxylic acid functional material having at least two carboxylic acid groups, and having an acid equivalent weight of greater than or equal to 600 g/mole; (c) a second carboxylic acid functional material having at least three carboxylic acid groups, and having an acid equivalent weight of less than or equal to 580 g/mole; (d) a photochromic compound; and (e) an aprotic organic solvent. The curable photochromic coating composition has an equivalents ratio of carbodiimide equivalents of the polycarbodiimide to a total carboxylic acid equivalents of the first carboxylic acid functional material and the second carboxylic acid functional material, that is from 0.5:1 to 3:1.

The features that characterize the present invention are pointed out with particularity in the claims, which are annexed to and form a part of this disclosure. These and other features of the invention, its operating advantages and the specific objects obtained by its use will be more fully understood from the following detailed description in which non-limiting embodiments of the invention are illustrated and described.

DESCRIPTION OF THE INVENTION

As used herein, the articles "a", "an", and "the" include plural referents unless otherwise expressly and unequivocally limited to one referent.

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to 1 to 6.1, 3.5 to 7.8, and 5.5 to 10.

Other than in the operating examples, or where otherwise indicated, all numbers expressing quantities of ingredients, reaction conditions, and so forth used in the specification and claims are to be understood as modified in all instances by the term "about".

As used herein, molecular weight values of polymers, such as weight average molecular weights (Mw) and number average molecular weights (Mn), are determined by gel permeation chromatography in the presence of a suitable eluent (such as tetrahydrofuran), and using appropriate standards, such as polystyrene standards. In some instances, and where noted, nuclear magnetic resonance (NMR) spectroscopy (such as $^1$H NMR) is used to determine Mn values.

As used herein, polydispersity index (PDI) values represent a ratio of the weight average molecular weight (Mw) to the number average molecular weight (Mn) of the polymer (i.e., Mw/Mn).

As used herein, the term "polymer" means homopolymers (e.g., prepared from a single monomer species), copolymers (e.g., prepared from at least two monomer species), and graft polymers.

As used herein, the term "(meth)acrylate" and similar terms, such as "(meth)acrylic acid ester", means methacrylates and/or acrylates. As used herein, the term "(meth)acrylic acid" means methacrylic acid and/or acrylic acid.

As used herein, "at least one of" is synonymous with "one or more of", whether the elements are listed conjunctively or disjunctively. For example, the phrases "at least one of A, B, and C" and "at least one of A, B, or C" each mean any one of A, B, or C, or any combination of any two or more of A, B, or C. For example, A alone; or B alone; or C alone; or A and B; or A and C; or B and C; or all of A, B, and C.

As used herein, "selected from" is synonymous with "chosen from" whether the elements are listed conjunctively or disjunctively. Further, the phrases "selected from A, B, and C" and "selected from A, B, or C" each mean any one of A, B, or C, or any combination of any two or more of A, B, or C. For example, A alone; or B alone; or C alone; or A and B; or A and C; or B and C; or all of A, B, and C.

As used herein, the term "photochromic" and similar terms, such as "photochromic compound", means having an absorption spectrum for at least visible radiation that varies in response to absorption of at least actinic radiation. Further, as used herein the term "photochromic material" means any substance that is adapted to display photochromic properties (such as adapted to have an absorption spectrum for at least visible radiation that varies in response to absorption of at least actinic radiation) and which includes at least one photochromic compound.

As used herein, the term "actinic radiation" means electromagnetic radiation that is capable of causing a response in a material, such as, but not limited to, transforming a photochromic material from one form or state to another as discussed in further detail herein.

As used herein, the term "photochromic material" includes thermally reversible photochromic materials and compounds and non-thermally reversible photochromic materials and compounds. The term "thermally reversible photochromic compounds/materials" as used herein means compounds/materials capable of converting from a first state (such as a "clear state") to a second state (such as a "colored state") in response to actinic radiation, and reverting back to the first state in response to thermal energy. The term "non-thermally reversible photochromic compounds/materials" as used herein means compounds/materials capable of converting from a first state (such as a "clear state") to a second state (such as a "colored state") in response to actinic radiation, and reverting back to the first state in response to actinic radiation of substantially the same wavelength(s) as the absorption(s) of the colored state.

As used herein, to modify the term "state", the terms "first" and "second" are not intended to refer to any particular order or chronology, but instead refer to two different conditions or properties. For purposes of non-limiting illustration, the first state and the second state of a photochromic compound can differ with respect to at least one optical property, such as but not limited to the absorption of visible and/or UV radiation. Thus, according to various non-limiting embodiments disclosed herein, the photochromic compounds used in conjunction with the present invention can have a different absorption spectrum in each of the first and second state. For example, while not limiting herein, a photochromic compound used in conjunction with the present invention can be clear in the first state and colored in the second state. Alternatively, a photochromic compound used in conjunction with the present invention can have a first color in the first state and a second color in the second state. Additionally, a photochromic-dichroic compound used in conjunction with the present invention can have a first alignment in a first state, and a second alignment in a second state, in which one of the first alignment and second alignment is substantially non-aligned.

As used herein, the term "optical" means pertaining to or associated with light and/or vision. For example, according to various non-limiting embodiments disclosed herein, the optical article or element or device can be chosen from ophthalmic articles, elements and devices, display articles, elements and devices, windows, mirrors, and active and passive liquid crystal cell articles, elements and devices.

As used herein, the term "ophthalmic" means pertaining to or associated with the eye and vision. Non-limiting examples of ophthalmic articles or elements include corrective and non-corrective lenses, including single vision or multi-vision lenses, which can be either segmented or non-segmented multi-vision lenses (such as, but not limited to, bifocal lenses, trifocal lenses and progressive lenses), as well as other elements used to correct, protect, or enhance (cosmetically or otherwise) vision, including without limitation contact lenses, intra-ocular lenses, magnifying lenses, and protective lenses or visors.

As used herein, the term "display" means the visible or machine-readable representation of information in words, numbers, symbols, designs or drawings. Non-limiting examples of display elements include screens, monitors, and security elements, such as security marks.

As used herein, the term "window" means an aperture adapted to permit the transmission of radiation therethrough. Non-limiting examples of windows include automotive and aircraft transparencies, windshields, filters, shutters, and optical switches.

As used herein, the term "mirror" means a surface that specularly reflects a large fraction of incident light.

As used herein, the term "liquid crystal cell" refers to a structure containing a liquid crystal material that is capable of being ordered. A non-limiting example of a liquid crystal cell element is a liquid crystal display.

As used herein, spatial or directional terms, such as "left", "right", "inner", "outer", "above", "below", and the like, relate to the invention as described herein. It is to be understood, however, that the invention can assume various alternative orientations and, accordingly, such terms are not to be considered as limiting.

As used herein, the terms "formed over", "deposited over", "provided over", "applied over", residing over", or "positioned over" mean formed, deposited, provided, applied, residing, or positioned on but not necessarily in direct (or abutting) contact with the underlying element, or surface of the underlying element. For example, a layer "positioned over" a substrate does not preclude the presence of one or more other layers, coatings, or films of the same or different composition located between the positioned or formed layer and the substrate.

All documents, such as but not limited to issued patents and patent applications, referred to herein, and unless otherwise indicated, are to be considered to be "incorporated by reference" in their entirety.

As used herein, recitations of "linear or branched" groups, such as linear or branched alkyl, are herein understood to include a methylene group or a methyl group; groups that are linear, such as linear $C_2$-$C_{20}$ alkyl groups; and groups that are appropriately branched, such as branched $C_3$-$C_{20}$ alkyl groups.

As used herein, the term "halogen" and related terms, such as "halogen group(s)" and/or "halo group(s)", means a single bonded halogen atom, such as selected from fluoro (F), chloro (Cl), bromo (Br), and/or iodo (I).

As used herein, and unless otherwise explicitly stated, the term "hydrogen" and related terms, such as "hydrogen group(s)", means a single bonded hydrogen (—H).

As used herein, and unless otherwise explicitly stated, the term "acid equivalent weight", such as with regard to the first carboxylic acid functional material and the second carboxylic acid functional material, means "carboxylic acid equivalent weight" and is determined in accordance with art-recognized methods, such as ASTM International ASTM D1639; and/or determining the molecular weight or average molecular weight and the average number of carboxylic acid groups per molecule, such as by NMR analysis, and calculating the acid equivalent weight by dividing the molecular weight by the number of carboxylic acid groups per molecule.

As used herein, the term "aliphatic" and related terms, such as "aliphatic group(s)", means non-cyclic and non-aromatic hydrocarbon groups, which include at least one carbon atom, such as 1 to 20 carbon atoms, such as $C_1$-$C_{20}$ aliphatic groups, or $C_1$-$C_{10}$ aliphatic groups, or $C_1$-$C_6$ aliphatic groups; can be linear or branched; optionally include one or more interior and/or terminal alkene (or alkenyl) groups; and optionally include one or more interior and/or terminal alkyne (or alkynyl) groups. When including two or more alkene groups, the alkene groups of an aliphatic group can be conjugated and/or non-conjugated. When including two or more alkyne groups, the alkyne groups of an aliphatic group can be conjugated and/or non-conjugated. When including at least one alkene group and at least one alkyne group, the alkene and alkyne groups of the aliphatic group can be conjugated and/or non-conjugated relative to each other.

Examples of aliphatic groups include, but are not limited to, alkyl groups. As used herein, the term "alkyl" and related terms, such as "alkyl group(s)", means groups which include at least one carbon atom, such as 1 to 20 carbon atoms, such as $C_1$-$C_{20}$ alkyl groups, or $C_1$-$C_{10}$ alkyl groups, or $C_1$-$C_6$ alkyl groups; are linear or branched; and are saturated (and correspondingly are free of alkene groups and alkyne groups). Examples of alkyl groups include, but are not limited to, methyl, ethyl, n-propyl, iso-propyl, n-butyl, iso-butyl, sec-butyl, t-butyl, linear or branched pentyl, linear or branched hexyl, linear or branched heptyl, linear or branched octyl, linear or branched nonyl, linear or branched decyl, linear or branched undencyl, linear or branched dodecyl, linear or branched tridecyl, linear or branched tetradecyl, linear or branched pentadecyl, linear or branched hexadecyl, linear or branched heptadecyl, linear or branched octadecyl, linear or branched nonadecyl, and linear or branched eicosanyl.

Examples of aliphatic groups include, but are not limited to, alkenyl groups. As used herein, the term "alkenyl" and related terms, such as "alkenyl groups", means groups which include at least two carbon atoms, such as 2 to 20 carbon atoms, such as $C_2$-$C_{20}$ alkenyl groups, or $C_2$-$C_{10}$ alkenyl groups, or $C_2$-$C_6$ alkenyl groups; are linear or branched; and include one or more interior and/or terminal alkene (or alkenyl) groups. Examples of alkenyl groups include, but are not limited to, those examples of linear or branched alkyl groups recited previously herein, which have at least two carbon atoms and at least one alkene (or alkenyl) group, such as, but not limited to, ethenyl, linear or branched propenyl, linear or branched butenyl, linear or branched pentenyl, linear or branched hexenyl, etc.

Examples of aliphatic groups include, but are not limited to, alkynyl groups. As used herein, the term "alkynyl" and related terms, such as "alkynyl group(s)", means groups which include at least two carbon atoms, such as 2 to 20 carbon atoms, such as $C_2$-$C_{20}$ alkynyl groups, or $C_2$-$C_{10}$ alkynyl groups, or $C_2$-$C_6$ alkynyl groups; are linear or branched; and include one or more interior and/or terminal alkyne (or alkynyl) groups. Examples of alkynyl groups include, but are not limited to, those examples of linear or branched alkyl groups recited previously herein, which have at least two carbon atoms and at least one alkyne (or alkynyl) group, such as, but not limited to, ethynyl, linear or branched propynyl, linear or branched butynyl, linear or branched pentynyl, linear or branched hexynyl, etc.

As used herein, the term "cycloaliphatic" and related terms, such as "cycloaliphatic group(s)", means cyclic and non-aromatic hydrocarbon groups, which include at least three carbon atoms, such as 3 to 20 carbon atoms, such as $C_3$-$C_{20}$ cycloaliphatic groups, or $C_3$-$C_{10}$ cycloaliphatic groups, or $C_3$-$C_8$ cycloaliphatic groups; optionally include at least one unsaturated group selected from alkene and/or alkyne; and optionally include two or more fused cycloaliphatic rings.

Examples of cycloaliphatic groups include, but are not limited to, cycloalkyl groups. As used herein, the term "cycloalkyl" and related terms, such as "cycloalkyl group(s)", means groups which include at least three carbon atoms, such as 3 to 20 carbon atoms, such as $C_3$-$C_{20}$ cycloalkyl groups, or $C_3$-$C_{10}$ cycloalkyl groups, or $C_3$-$C_8$ cycloalkyl groups; optionally include at least one unsaturated group selected from alkene and/or alkyne; and optionally include two or more fused cycloalkyl rings. Examples of cycloalkyl groups include, but are not limited to, cyclopropyl; cyclobutyl; cyclopentyl; cyclohexyl; cycloheptyl; cyclooctyl; cyclononyl; cyclodecyl; cycloundecyl; cyclododecyl; bicyclo[2.2.1]heptanyl; decahydronaphthalenyl; tetradecahydroanthracenyl; tetradecahydrophenanthrenyl; and dodecahydro-1H-phenalenyl.

As used herein, the term "heterocycloaliphatic" and related terms, such as "heterocycloaliphatic group(s)", means cyclic and non-aromatic groups, which include at least two carbon atoms, such as 2 to 20 carbon atoms, such as $C_2$-$C_{20}$ heterocycloaliphatic groups, or $C_2$-$C_{10}$ heterocycloaliphatic groups, or $C_2$-$C_8$ heterocycloaliphatic groups; and which have at least one hetero atom in the cyclic ring, such as, but not limited to, O, S, N, P, and combinations thereof; optionally include at least one unsaturated group selected from alkene and/or alkyne; and optionally include two or more fused non-aromatic cyclic rings, at least one of which is a fused heterocycloaliphatic ring.

Examples of heterocycloaliphatic groups include, but are not limited to, heterocycloalkyl groups. As used herein, the term "heterocycloalkyl" and related terms, such as "heterocycloalkyl group(s)", means groups which include at least two carbon atoms, such as 2 to 20 carbon atoms, such as $C_2$-$C_{20}$ heterocycloalkyl groups, or $C_2$-$C_{10}$ heterocycloalkyl groups, or $C_2$-$C_8$ heterocycloalkyl groups; and which have at least one hetero atom in the cyclic ring, such as, but not limited to, O, S, N, P, and combinations thereof; optionally include at least one unsaturated group selected from alkene and/or alkyne; and optionally include two or more fused non-aromatic cyclic rings, at least one of which is a fused heterocycloalkyl ring. Examples of heterocycloalkyl groups include, but are not limited to, imidazolyl, tetrahydrofuranyl, tetrahydropyranyl, piperidinyl, piperazinyl, morpholinyl, 7-oxabicyclo[2.2.1]heptanyl, octahydrocyclopenta[b]pyranyl, and octahydro-1H-isochromenyl.

As used herein, the term "aryl" and related terms, such as "aryl group(s)", means cyclic aromatic groups, which include at least 6 carbon atoms, such as $C_6$-$C_{20}$ aryl groups, or $C_6$-$C_{14}$ aryl groups; and optionally include at least two fused rings, at least one of which is a fused aromatic ring. Examples of aryl groups include, but are not limited to, phenyl, naphthalenyl, anthracenyl, phenanthrenyl, triphenylenyl, 9,10-dihydroanthracenyl, 9,10-dihydrophenanthrenyl, and triptycenyl.

As used herein, the term "arylaliphatic" and related terms, such as "arylaliphatic group(s)", means an aryl group that is substituted with at least one aliphatic group. With some embodiments, the arylaliphatic group is covalently bonded to another group through at least one of the aliphatic groups thereof. The aryl groups and aliphatic groups of the arylaliphatic groups are each as described previously herein. A class of arylaliphatic groups includes, but is not limited to, aralkyl groups. Examples of aralkyl groups include, but are not limited to, benzyl and phenethyl.

As used herein, the term "heteroaryl" and related terms, such as "heteroaryl group(s)", means cyclic aromatic groups, which include at least 3 carbon atoms, such as $C_3$-$C_{20}$ heteroaryl groups, or $C_5$-$C_{14}$ heteroaryl groups; at least one heteroatom in the aromatic ring, such as —O—, —N—, and/or —S—; and optionally include at least two fused rings, at least one of which is a fused heteroaromatic ring. Examples of heteroaryl groups include, but are not limited to, pyrazolyl, imidazolyl, triazinyl, furanyl, thiophenyl, pyranyl, pyridinyl, isoquinolinyl, and pyrimidinyl.

As used herein, recitations of "substituted" group means a group including, but not limited to, aliphatic groups, cycloaliphatic groups, heterocycloaliphatic groups, aryl groups, arylaliphatic groups, and heteroaryl groups, in which at least one hydrogen thereof has been replaced or substituted with a group that is other than hydrogen, such as, but not limited to, alkoxy groups; halo groups (e.g., F, Cl, I, and Br); hydroxyl groups; thiol groups; alkylthio groups; arylthio groups; ketone groups; aldehyde groups; carboxylic acid groups; carboxylic acid ester groups; phosphoric acid groups; phosphoric acid ester groups; sulfonic acid groups; sulfonic acid ester groups; nitro groups; cyano groups; alkyl groups (including aralkyl groups); alkenyl groups; alkynyl groups; haloalkyl groups; perhaloalkyl groups; heterocycloalkyl groups; aryl groups (including alkaryl groups, including hydroxyl substituted aryl, such as phenol); heteroaryl groups; amino groups, such as —N($R^{11'}$)($R^{12'}$) where $R^{11'}$ and $R^{12'}$ are each independently selected, for example, from hydrogen, aliphatic groups, cycloaliphatic groups, heterocycloaliphatic groups, aryl, arylaliphatic, and heteroaryl; carboxylate groups (—O—C(O)—R, where R is, for example, selected from aliphatic groups, cycloaliphatic groups, heterocycloaliphatic groups, aryl, arylaliphatic, and heteroaryl); siloxane groups; alkoxysilane groups; polysiloxane groups; amide groups; carbamate groups; carbonate groups; urea groups; polyester groups; polyether groups; polycarbonate groups; polyurethane groups; acrylate groups; methacrylate groups; nitrogen-containing heterocycles; or combinations thereof, including those classes and examples as described herein.

The curable photochromic adhesive compositions of the present invention include at least one polycarbodiimide. The polycarbodiimides of the curable photochromic compositions include at least two carbodiimide groups, such as at least three carbodiimide groups, or at least four carbodiimide groups.

The polycarbodiimide of the curable photochromic adhesive compositions of the present invention has a carbodiimide equivalent weight of at least 250 grams per mole (g/mole), such as at least 300 g/mole, or at least 350 g/mole, or at least 400 g/mole, or at least 500 g/mole. With some embodiments, the polycarbodiimide of the curable photochromic adhesive compositions of the present invention has a carbodiimide equivalent weight of from 250 g/mole to 1000 g/mole, or from 300 g/mole to 800 g/mole, or from 300 g/mole to 650 g/mole. The carbodiimide equivalent weight, of the polycarbodiimides, is determined, with some embodiments, in accordance with art-recognized methods.

With some embodiments of the present invention, the polycarbodiimide, of the curable photochromic adhesive compositions, is formed by a reaction that includes condensation of polyfunctional isocyanates, in which each polyfunctional isocyanate is selected from the group consisting of aliphatic polyfunctional isocyanates, cycloaliphatic polyfunctional isocyanates, heterocycloaliphatic polyfunctional isocyanates, aryl polyfunctional isocyanates, arylaliphatic polyfunctional isocyanates, and combinations of two or more thereof.

As used herein, the term "polyfunctional isocyanate" means a material having at least two isocyanate groups. With some embodiments, the polyfunctional isocyanates used to form the polycarbodiimides of the curable photochromic compositions of the present invention, have from 2 to 10 isocyanate groups, or from 2 to 8 isocyanate groups, or from 2 to 6 isocyanate groups, or 2 to 5 isocyanate groups, or 2 or 3 isocyanate groups, in each case inclusive of the recited values.

Examples of polyfunctional isocyanates that can be used to prepare the polycarbodiimides of the curable photochromic compositions of the present invention, include, but are not limited to, toluene-2,4-diisocyanate; toluene-2,6-diisocyanate; diphenyl methane-4,4'-diisocyanate; diphenyl methane-2,4'-diisocyanate; para-phenylene diisocyanate; biphenyl diisocyanate; 3,3'-dimethyl-4,4'-diphenylene diisocyanate; tetramethylene-1,4-diisocyanate; hexamethylene-1,6-diisocyanate; 2,2,4-trimethyl hexane-1,6-diisocyanate; lysine methyl ester diisocyanate; bis(isocyanato ethyl)fumarate; isophorone diisocyanate; ethylene diisocyanate; dodecane-1,12-diisocyanate; cyclobutane-1,3-diisocyanate; cyclohexane-1,3-diisocyanate; cyclohexane-1,4-diisocyanate; methyl cyclohexyl diisocyanate; hexahydrotoluene-2,4-diisocyanate; hexahydrotoluene-2,6-diisocyanate; hexahydrophenylene-1,3-diisocyanate; hexahydrophenylene-1,4-diisocyanate; perhydrodiphenylmethane-2,4'-diisocyanate; perhydrodiphenylmethane-4,4'-diisocyanate; norbornane diisocyanate; mixtures of two or more thereof; and dimers or trimers of each thereof or combinations thereof, including linkages selected from the group consisting of isocyanurate, uretdione, biuret, allophanate, and combinations thereof.

Examples of commercially available polycarbodiimide materials that can be used with the curable compositions of the present invention include, but are not limited to, CARBODILITE V-02B, CARBODILITE V-04K, CARBODILITE V-05, CARBODILITE E02, CARBODILITE E04, CARBODILITE V-02, CARBODILITE V-02-L2, CARBODILITE V-04, and CARBODILITE V-SV-06 polycarbodiimides, which are commercially available from Nisshinbo Holdings Inc.; NK ASSIST CIR polycarbodiimide, which is commercially available from Nicca Chemical Co., Ltd.; UCARLINK XL-29SE polycarbodiimide, which is commercially available from Union Carbide; EX-5558 polycarbodiimide, which is commercially available from Stahl Holland; and STABAXOL P, STABAXOL P 100, and STABAXOL P 200 polycarbodiimides, which are commercially available from Rhein Chemie Staboxol.

The carboxylic acid functional material of the curable photochromic adhesive compositions of the present invention has at least two carboxylic acid groups, such as at least three carboxylic acid groups, or at least four carboxylic acid groups. With some embodiments, the first carboxylic acid functional material has from 2 to 6 carboxylic acid groups, or from 2 to 5 carboxylic acid groups, or from 2 to 4 carboxylic acid groups.

The carboxylic acid functional material of the curable photochromic adhesive compositions of the present invention has an acid equivalent weight (carboxylic acid equivalent weight) of greater than or equal to 600 g/mole, such as greater than or equal to 650 g/mole, or greater than or equal to 700 g/mole. With some embodiments, the carboxylic acid functional material, of the curable photochromic adhesive compositions of the present invention, has an acid equivalent weight of from 600 g/mole to 40,000 g/mole, or from 650 g/mole to 40,000 g/mole, or from 700 g/mole to 40,000 g/mole, or from 600 g/mole to 20,000 g/mole, or from 600 g/mole to 10,000 g/mole, in each case inclusive of the recited values.

The carboxylic acid functional material of the curable photochromic adhesive compositions of the present invention, with some embodiments, has an Mn of less than or equal to 80,000 g/mole, such as less than or equal to 40,000 g/mole, or less than or equal to 20,000 g/mole. With some embodiments, the carboxylic acid functional material, of the curable photochromic adhesive compositions of the present invention, has an Mn of from 1200 g/mole to 80,000 g/mole, or from 1200 g/mole to 40,000 g/mole, or from 1200 g/mole to 20,000 g/mole, in each case inclusive of the recited values.

The carboxylic acid functional material of the curable photochromic adhesive compositions of the present invention, with some embodiments, is selected from carboxylic acid functional polyester, carboxylic acid functional polycarbonate, carboxylic acid functional polyether, carboxylic acid functional polyurethane, carboxylic acid functional polyurea, carboxylic acid functional polyamide, carboxylic acid functional poly(siloxane), carboxylic acids salts of each thereof, copolymers thereof, or combinations thereof.

The carboxylic acid functional polyesters, from which the carboxylic acid functional material of the curable photochromic adhesive compositions of the present invention, can be selected, can be prepared in accordance with art-recognized methods. With some embodiments, and for purposes of non-limiting illustration, the carboxylic acid functional polyesters from which the carboxylic acid functional material can be selected are prepared by reacting carboxylic acid functional materials (and/or cyclic anhydrides thereof, and/or esters thereof) having carboxylic acid functionalities (or effective carboxylic acid functionalities, such as in the case of cyclic anhydrides and carboxylic acid esters) of at least 2, and polyols having hydroxy functionalities of at least 2. The molar equivalents ratio of carboxylic acid groups to hydroxy groups of the reactants is selected such that the resulting polyester has carboxylic acid functionality, and a desired molecular weight.

Examples of multifunctional carboxylic acids useful in preparing carboxylic acid functional polyesters, from which the carboxylic acid functional material of the curable photochromic adhesive compositions of the present invention, can be selected include, but are not limited to, benzene-1,2,4-tricarboxylic acid, phthalic acid, tetrahydrophthalic acid, hexahydrophthalic acid, endobicyclo-2,2,1,5-heptyne-2,3-dicarboxylic acid, tetrachlorophthalic acid, cyclohexanedioic acid, succinic acid, isophthalic acid, terephthalic acid, azelaic acid, maleic acid, trimesic acid, 3,6-dichlorophthalic acid, adipic acid, sebacic acid, and like multifunctional carboxylic acids (optionally including appropriate cyclic anhydrides thereof and/or esters thereof).

Examples of polyols that can be used to prepare the carboxylic acid functional polyesters, from which the carboxylic acid functional material of the curable photochromic adhesive compositions of the present invention, can be selected include, but are not limited to, glycerin, trimethylolpropane, trimethylolethane, trishydroxyethylisocyanurate, pentaerythritol, ethylene glycol, propylene glycol, trimethylene glycol, 1,3-, 1,2- and 1,4-butanediols, pentane diols (such as, but not limited to, 1,5-pentane diol), heptanediol, hexanediol (such as, but not limited to, 1,6-hexane diol), octanediol, 4,4'-(propane-2,2-diyl)dicyclohexanol, 4,4'-methylenedicyclohexanol, neopentyl glycol, 2,2,3-trimethylpentane-1,3-diol, 1,4-dimethylolcyclohexane, 2,2,4-trimethylpentane diol, 4,4'-(propane-2,2-diyl)diphenol, 4,4'-methylenediphenol, and like polyols.

With some embodiments, the carboxylic acid functional polyester, from which the carboxylic acid functional material of the curable photochromic adhesive compositions of the present invention is selected, includes or is a carboxylic acid functional oligomeric, or branched, or hyper-branched polyester that includes at least three terminal carboxylic acid groups. The carboxylic acid functional oligomeric, or branched, or hyper-branched polyester can be prepared in accordance with art-recognized methods, such as from the reaction of a polyol having at least three hydroxyl groups and a cyclic carboxylic acid ester, which, with some embodiments, involves the formation of a hydroxyl functional polyester intermediate, which is then modified to include carboxylic acid groups. Examples of polyols from which the carboxylic acid functional oligomeric, or branched, or hyper-branched polyester can be prepared include, but are not limited to, glycerol, trimethylolethane, trimethylolpropane, pentaerythritol, diglycerol (such as α,α'-diglycerol), di(trimethylolethane), di(trimethylolpropane), di(pentaerythritol), and combinations of two or more thereof. Examples of cyclic carboxylic acid esters from which the carboxylic acid functional oligomeric, or branched, or hyper-branched polyester can be prepared include, but are not limited to, lactones having from 4 to 8 atoms in the cyclic ring with the ester oxygen and the carbonyl carbon bonded directly to each other, such as beta-propiolactone, gamma-butyrolactone, delta-valerolactone, epsilon-caprolactone, and combinations of two or more thereof.

In accordance with some embodiments, when preparation of the carboxylic acid functional oligomeric, or branched, or hyper-branched polyester involves the formation of a hydroxyl functional polyester intermediate, the hydroxyl functional polyester intermediate can be modified to include carboxylic acid functionality by reaction with a cyclic anhydride, such as, but not limited to succinic anhydride.

Commercially available examples of polyols that can be used in the preparation of carboxylic acid functional polyesters of the compositions of the present invention include, but are not limited to, the following. Linear aliphatic polyester polyols include, but are not limited to, STEPANOL PC polyester polyols, which are commercially available from Stepan Company. The following polyols are commercially available from DIC Corporation: OD-X-286, OD-X-102, OD-X-355, OD-X-2330, OD-X-240, OD-X-668, OD-X-21068, OD-X-2547, OD-X-2420, OD-X-2523, OD-X-2555, and OD-X-2560 polyester polyols; OD-X-2155 and OD-X-640 polycaprolactone diols; and OD-X-2586 triol. The following polyols are commercially available from MilliporeSigma: a polycaprolactone polyol having CAS Number 36890-68-3; a triol having CAS Number 37625-56-2. The following polyols are commercially available from TriiSO: PERSTORP BOLTORN H2004 hyperbranched polyester polyols; and INGEVITY CAPA polycaprolactone polyols.

The carboxylic acid functional polycarbonates, from which the carboxylic acid functional material of the curable photochromic adhesive compositions of the present invention, can be selected, can be prepared in accordance with art-recognized methods. With some embodiments, and for purposes of non-limiting illustration, the carboxylic acid functional polycarbonates are prepared by first preparing a hydroxyl functional polycarbonate intermediate, and then modifying the hydroxyl functional polycarbonate intermediate to include carboxylic acid groups.

With some embodiments, and for purposes of non-limiting illustration, the hydroxyl functional polycarbonate intermediate can be prepared from the reaction of a polyol, such as a diol, with a carbonyl dihalide, such as carbonyl dichloride, with removal of the resulting halide acid, such as HCl. For purposes of additional non-limiting illustration, the hydroxyl functional polycarbonate intermediate can be prepared from the ring-opening polymerization of cyclic carbonates. For purposes of further non-limiting illustration, the hydroxyl functional polycarbonate intermediate can be prepared from a transesterification reaction of a polyol, such as a diol, and a bis-carbonate, represented by the following formula, R—O—C(O)—O—R, where each R is independently selected from, for example, an aliphatic group, a cycloaliphatic group, and an aryl group. For purposes of further non-limiting illustration, in the case of diphenyl carbonate, the transesterification reaction with a polyol results in the formation of a hydroxyl functional polycarbonate intermediate, and is accompanied with the removal of the resulting phenol. For purposes of further additional non-limiting illustration, in the case of dialkyl carbonates, such as dimethyl carbonate and diethyl carbonate, the transesterification reaction with a polyol results in the formation of a hydroxyl functional polycarbonate intermediate, and is accompanied with the removal of the resulting alkyl alcohol.

Commercially available hydroxyl functional polycarbonates that can be used as intermediates in the formation of carboxylic acid functional polycarbonates, include, but are not limited to, the following. The following polycarbonate diols are commercially available from Ube Chemical: ETERNACOLL UH-100D, ETERNACOLL PH-300D, ETERNACOLL PH-200D, ETERNACOLL PH-200, and ETERNACOLL UH-200 polycarbonate diols. The following polycarbonate diol is commercially available from Stahl USA, PC-1122 polycarbonate diol. The following polycarbonate diol is commercially available from Asahi, DURANOL T5652 polycarbonate diol.

The hydroxyl functional polycarbonate intermediate can be modified to include carboxylic acid groups in accordance with art-recognized methods. With some embodiments, the hydroxyl functional polycarbonate intermediate is reacted with a cyclic anhydride, such as, but not limited to, succinic anhydride, which results in the formation of a carboxylic acid functional polycarbonate.

The carboxylic acid functional polyether, from which the carboxylic acid functional material of the curable photochromic adhesive compositions of the present invention, can be selected, can be prepared in accordance with art-recognized methods. With some embodiments, and for purposes of non-limiting illustration, the carboxylic acid functional polyethers are prepared by first preparing a polyether intermediate having hydroxyl functionality, and then modifying the polyether intermediate to include carboxylic acid groups.

With some embodiments, and for the purposes of non-limiting illustration, the polyether intermediate can be prepared, by ring-opening polymerization of cyclic ethers or mixtures of cyclic ethers including, but not limited to, alkylene oxides and/or tetrahydrofuran, using acid or base catalysts with a polyhydric initiator or a mixture of polyhydric initiators. Non-limiting examples of polyhydric initiators include polyols recited previously herein. Illustrative alkylene oxides include ethylene oxide, propylene oxide, butylene oxide, amylene oxides, styrene oxide, and halogenated alkylene oxides such as trichlorobutylene oxide. Examples of polyether polyols, include, but are not limited to, poly(tetrahydrofuran)diols, which are also known as poly(tetramethylene ether) glycols.

Examples of commercially available hydroxyl functional polyether intermediates include, but are not limited to, those available from Dow Chemicals under the trade name VORANOL™; BASF under the trade names LUPRANOL, PLURACOL, PLURONIC, and PolyTHF; and Bayer under the DESMOPHEN and ACCLAIM trade names.

The carboxylic acid functional polyurethane, from which the carboxylic acid functional material of the curable photochromic adhesive compositions of the present invention, can be selected, can be prepared in accordance with art-recognized methods. With some embodiments, and for purposes of non-limiting illustration, the carboxylic acid functional polyurethanes are prepared by first forming a polyurethane intermediate having hydroxyl functionality or isocyanate functionality, and then modifying the polyurethane intermediate to include carboxylic acid groups. The polyurethane intermediate can be prepared in accordance with art-recognized methods, such as, but not limited to, the reaction of polyols, such as diols, with polyisocyanates, such as di-isocyanates. The polyols and polyisocyanates that can be used to prepare the polyurethane intermediate can, with some embodiments, be selected from those classes and examples of polyols and polyisocyanate recited previously herein.

Hydroxyl functional polyurethane intermediates can be modified to include carboxylic acid functionality in accordance with art-recognized methods. With some embodiments, the hydroxyl functional polyurethane intermediate is reacted with a cyclic anhydride, such as, but not limited to, succinic anhydride, which results in the formation of a carboxylic acid functional polyurethane. With some further embodiments, the hydroxyl functional polyurethane intermediate is reacted with an isocyanate functional carboxylic acid ester, such as but not limited to, an alkyl 3-isocyanatopropanoate, followed by art-recognized work up procedures, which results in the formation of a carboxylic acid functional polyurethane. Isocyanate functional polyurethane intermediates can be modified to include carboxylic acid functionality in accordance with art-recognized methods. With some embodiments, the isocyanate functional polyurethane intermediate is reacted with hydroxyl functional carboxylic acid ester, such as, but not limited to, a suitable carboxylic acid ester of 3-hydroxypropionic acid, which results in the formation of a carboxylic acid ester functional polyurethane. The carboxylic acid ester functional polyurethane is, with some embodiments, subjected to art-recognized work up procedures to convert it to a carboxylic acid functional polyurethane.

The carboxylic acid functional polyurea polymers, polyurethane polymers, and polyurea-polyurethane copolymers from which the carboxylic acid functional material of the curable photochromic adhesive compositions of the present invention, can be selected, can be prepared in accordance with art-recognized methods. The preparation of carboxylic acid functional polyurea is described in, for example, U.S. Pat. No. 6,610,812 B1. Typically, carboxylic acid groups can be incorporated onto the polyol component of a polyurethane or the amine component of a polyurea. Alternatively, carboxylic acid groups can also be attached to the isocyanate component of the polyurethane or polyurea, such as with a hydroxyl functional carboxylic acid ester material, with subsequent conversion of the carboxylic acid ester moiety to a carboxylic acid functional group. For purposes of non-limiting illustration, carboxylic acid functional polyurethanes and carboxylic acid functional polyureas can be prepared in accordance with the following two art-recognized methods. In a first method, the carboxylic acid functional polyurethane/polyurea is prepared from a prepolymer having carboxylic acid functional moieties. In a second method, the carboxylic acid functional group is incorporated during a post-polymerization reaction, whereby the carboxylic acid functional groups are introduced or attached to the polyurethane or polyurea.

Hydroxyl functional polyurea intermediates and hydroxyl functional polyurea-polyurethane copolymer intermediates can be prepared in accordance with art-recognized methods, such as from the reaction of polyamines (having primary amine and/or secondary amine groups), polyisocyanates, and polyols in an appropriate order and/or an appropriate set of sequential reactions. For purposes of non-limiting illustration, polyamine can be reacted with an appropriate excess of polyisocyanate to form an isocyanate functional polyurea, that is subsequently reacted with a polyol to form a hydroxyl functional polyurea/polyurethane intermediate. Classes and examples of suitable polyols and polyisocyanates include, but are not limited to those classes and examples discussed previously herein. Classes of polyamines having primary amine functionality and/or secondary amine functionality include, but are not limited to, aliphatic polyamines, cycloaliphatic polyamines, aromatic polyamines, and combinations thereof.

Carboxylic acid functional polyamides, from which the carboxylic acid functional material of the curable photochromic adhesive compositions of the present invention can be selected, can be prepared in accordance with art-recognized methods. With some embodiments, carboxylic acid functional polyamides are prepared from the reaction of an appropriate excess of difunctional carboxylic acid with diamine (such as having two primary amine groups). For purposes of non-limiting illustration, a carboxylic acid functional polyamide can be prepared from the reaction of an appropriate excess of adipic acid and hexamethylenediamine. With some further embodiments, carboxylic acid functional polyamides are prepared from the reaction of a hydroxyl functional polyamide intermediate with a cyclic carboxylic acid anhydride. Hydroxyl functional polyamide intermediates can be prepared in accordance with art-recognized methods, such as, but not limited to, reaction of difunctional carboxylic acid with aminoalcohol; and by aminolysis, such as by reaction of carboxylates, carboxylic acids, or lactones with amino alcohols. Examples of suitable diamines and amino alcohols that can be used to prepare carboxylic acid functional polyamides include, but are not limited to, hexamethylenediamine; ethylenediamine; phenylenediamine; monoethanolamine; diethanolamine; and isophorone diamine.

Carboxylic acid functional polysiloxanes, from which the carboxylic acid functional material of the curable photochromic adhesive compositions of the present invention can be selected, can be prepared in accordance with art-recognized methods. As described in, for example, US 2016/0347775 A1, carboxylic acid functional organopolysiloxanes can be prepared by the reaction of a difunctional cyclic carboxylic acid anhydride with an organopolysiloxane having two hydroxyl groups. With some embodiments, the difunctional cyclic carboxylic acid anhydride is an organopolysiloxane. Art-recognized silanol-terminated organopolysiloxane intermediates, having a wide number of repeating diorganosiloxy units, can be used to prepare the carboxylic acid functional polysiloxanes of the present compositions. Art-recognized carbinol-functional organopolysiloxane intermediates can also be used to prepare the carboxylic acid functional polysiloxanes of the present compositions. For purposes of non-limiting illustration, carbinol-functional organopolysiloxane intermediates can be prepared by the hydrosilylation of an alkenol (such as allyl alcohol or hexadecene-1-ol) with a bis(hydrogendiorganosilyl)-terminated organopolysiloxane. Examples of commercially available carboxylic acid functional polysiloxanes, which can be used in the compositions of the present invention include, but are not limited to, those available from Gelst, such as DMS-B25 carboxylic acid functional polysiloxane, which is described as a carboxydecyl terminated polydimethylsiloxane having a molecular weight of 10,000 g/mole; and DMS-B3 carboxylic acid functional polysiloxane, which is described as a carboxypropyl terminated polydimethylsiloxane with a molecular weight of 28,000 g/mole.

With some embodiments of the present invention, the carboxylic acid functional material of the curable photochromic adhesive compositions are prepared from hydroxyl functional thermoplastic polyurethane copolymers, in accordance with art-recognized methods. Commercially available hydroxyl functional thermoplastic polyurethanes that can be used as intermediates in the formation of carboxylic acid functional polyurethane copolymers, include, but are not limited to, PEARLSTICK, PEARLBOND, ESTANE, TECOFLEX, and CARBOTHANE hydroxyl functional polyurethanes commercially available from Lubrizol; CHRONOFLEX AL, CHRONOFLEX C, CHHRONOTHANE P, and CHRONOSIL hydroxyl functional polyurethanes commercially available from AdvanSource Biomaterials Corporation (Wilmington, MA); ELAST-EON hydroxyl functional polyurethanes commercially available from AorTech International Plc (Dundee, United Kingdom); and QUADRATHANE hydroxyl functional polyurethanes commercially available from Biomerics.

The carboxylic acid salts of the carboxylic acid functional materials of the curable photochromic compositions of the present invention can be prepared in accordance with art-recognized methods. In accordance with some embodiments, such as described in WO 2017/180220 A1, the carboxylic acid functional groups can be at least partially or completely neutralized with an inorganic base, such as a volatile amine, to form a carboxylic acid salt group. Examples of suitable amines include, but are not limited to, ammonia, dimethylamine, trimethylamine, monoethanolamine, and dimethylethanol amine. In accordance with some embodiments, the volatile amines migrate out of the adhesive layer or coating layer (such as by volatilization) during formation of the layer, which results in formation (or exposure) of carboxylic acid groups that can engage in reactions (such as crosslinking reactions) with the polycarbodiimide component of the composition.

The curable photochromic adhesive compositions of the present invention include a photochromic compound, such as one or more photochromic compounds. Each photochromic compound, of the curable photochromic adhesive compositions, can be selected from known classes and examples of photochromic compounds, and can include combinations or mixtures thereof.

For example, although not limiting herein, mixtures of photochromic compounds can be used to attain certain activated colors, such as a near neutral gray or near neutral brown. See, for example, U.S. Pat. No. 5,645,767, col. 12, line 66 to col. 13, line 19, which describes the parameters that define neutral gray and brown colors and which disclosure is specifically incorporated by reference herein.

With some embodiments, the photochromic compound, of the curable photochromic compositions of the present invention, is selected from the group consisting of naphthopyrans, benzopyrans, phenanthropyrans, indenonaphthopyrans, spiro(indoline)naphthoxazines, spiro(indoline)pyridobenzoxazines, spiro(benzindoline)pyridobenzoxazines, spiro(benzindoline)naphthoxazines, spiro(indoline)-benzoxazines, fulgides, fulgimides, diarylethenes, and mixtures of such photochromic compounds.

Further examples of other photochromic compounds that can be used in curable photochromic adhesive compositions of the present invention include, but are not limited to, those disclosed at column 34, line 20 through column 35, line 13 of U.S. Pat. No. 9,028,728 B2, which disclosure is specifically incorporated by reference herein.

The photochromic compound is present in the curable photochromic adhesive composition in an amount at least sufficient so as to provide an article prepared from the composition with a desirable level of photochromic properties, which in some embodiments is referred to as a photochromic amount. With some embodiments, the amount of photochromic compound(s) present in the curable photochromic adhesive composition is from 0.001 percent by weight to 40 percent by weight, or from 0.001 to 30 percent by weight, or from 0.01 to 10 percent by weight, or from 0.1 to 5 percent by weight, based on the total solids weight of curable photochromic adhesive composition (including the weight of the photochromic compound(s), and inclusive of the recited values).

The curable photochromic adhesive compositions of the present invention include an aprotic organic solvent. The aprotic organic solvent, with some embodiments, is a polar aprotic organic solvent, such as having a dielectric constant of greater than 5. Examples of aprotic organic solvents that can be included in the curable photochromic adhesive compositions of the present invention include, but are not limited to, halomethanes, such as dichloromethane; cyclic ethers, such as tetrahydrofuran and dioxane; alkyl acetates, such as ethyl acetate; alkyl lactates, such as ethyl lactate; alkylnitriles (or alkyl cyanides), such as acetonitrile (or methyl cyanide); dialkylformamides, such as dimethylformamide; dialkylsulfoxides, such as dimethylsulfoxide; ketones, such as acetone and methyl ethyl ketone; N-substituted cyclic amides (lactams), such as N-methyl-2-pyrrolidone and N-butyl-2-pyrrolidone; aromatic compounds, such as toluene, xylene, anisole, butyl benzoate, dialkyl benzenes, trialkyl benzenes, AROMATIC 100 Fluid, which is a commercially available mixture of $C_9$-$C_{10}$ dialkyl- and trialkyl-benzenes, and AROMATIC 150 Fluid, which is a commercially available mixture of $C_9$-$C_{11}$ alkyl benzenes; and combinations of two or more thereof.

The aprotic organic solvent can be present in the curable photochromic adhesive compositions of the present invention in a wide range of amounts, such as from 5 to 95 percent by weight, or from 15 to 85 percent by weight, or from 20 to 80 percent by weight, in each case inclusive of the recited values, and the percent weights in each case being based on the total weight of the curable photochromic adhesive composition including the aprotic organic solvent.

With the curable photochromic adhesive compositions of the present invention, the equivalents ratio of carbodiimide equivalents of the polycarbodiimide to carboxylic acid equivalents of the carboxylic acid functional material is from 0.5:1 to 10:1. With some further embodiments, the curable photochromic adhesive compositions have an equivalents ratio of (i) carbodiimide equivalents of the polycarbodiimide to (ii) carboxylic acid equivalents of the carboxylic acid functional material, that is from 0.5:1 to 10:1, or from 0.5:1 to 5:1, or from 0.9:1 to 3:1, in each case inclusive of the recited ratios.

With some additional embodiments, the curable photochromic adhesive compositions have an equivalents ratio of (i) carbodiimide equivalents of the polycarbodiimide to (ii) a carboxylic acid equivalents of the carboxylic acid functional material that is greater than 3:1, such as from 3.5:1 to 10:1, or from 4:1 to 10:1, or from 5:1 to 10:1, in each case inclusive of the recited ratios.

The curable photochromic adhesive compositions of the present invention optionally include, with some embodiments, one or more additives, such as, but not limited to, waxes for flow and wetting; flow control agents, such as poly(2-ethylhexyl)acrylate; surface additives, such as polyether modified polydimethylsiloxanes; rheology control agents; leveling agents; antioxidants; light stabilizers, such as hindered amine light stabilizers; ultraviolet (UV) light absorbers; heat stabilizers; singlet oxygen quenchers; fixed-tint dyes; dichroic dyes; adhesion promoters; catalysts; and combinations of two or more thereof. Examples of useful antioxidants, hindered amine light stabilizers, and UV light absorbers include, but are not limited to, those available commercially from BASF under the trademarks IRGANOX and TINUVIN. These optional additives, when used, can be present in amounts up to 20 percent by weight, based on total solids weight of the curable photochromic adhesive composition (excluding solvent).

The optional additives that can be included in the curable photochromic adhesive compositions of the present invention, include one or more fixed-tint dyes. As used herein, the term "fixed-tint dye" and related terms, such as "fixed-colorant", "static colorant", "fixed dye", and "static dye", means dyes that are non-photosensitive materials, which do not physically or chemically respond to electromagnetic radiation with regard to the visually observed color thereof. The term "fixed-tint dye" and related terms as used herein does not include and is distinguishable from the term photochromic compound and related terms. As used herein, the term "non-photosensitive materials" means materials that do not physically or chemically respond to electromagnetic radiation with regard to the visually observed color thereof, including, but not limited to, fixed-tint dyes.

One or more fixed-tint dyes can be present in the curable photochromic adhesive compositions of the present invention for purposes including, but not limited to, providing a cured article prepared from the curable photochromic compositions with at least a base (or first) color characteristic of the fixed-tint dye, when the photochromic compound is not activated; and optionally a second color characteristic of the combination of the fixed-tint dye and the photochromic compound when activated, such as by exposed to actinic radiation.

The optional fixed-tint dye of the curable photochromic adhesive composition, with some embodiments, includes at least one of azo dyes, anthraquinone dyes, xanthene dyes, azime dyes, iodine, iodide salts, polyazo dyes, stilbene dyes, pyrazolone dyes, triphenylmethane dyes, quinoline dyes, oxazine dyes, thiazine dyes, and polyene dyes.

The fixed-tint dye can be present in the curable photochromic adhesive composition in varying amounts to provide the intended effect in the cured article prepared therefrom. With some embodiments, the fixed-tint dye is present in the curable photochromic adhesive composition in an amount of from 0.001 to 15 percent by weight, or from 0.01 to 10 percent by weight, or from 0.1 to 2.5 percent by weight, the percent weights in each case being based on the total solids weight of the curable photochromic adhesive composition (including the weight of the fixed-tint dye; and inclusive of the recited values).

The optional additives that can be included in the curable photochromic adhesive compositions of the present invention include one or more dichroic dyes. As used herein, the term "dichroism" and similar terms, such as "dichroic", means the ability to absorb one of two orthogonal plane polarized components of radiation (including transmitted and/or reflected radiation) more strongly than the other orthogonal plane polarized component.

Examples of dichroic dyes that can be included in the curable photochromic adhesive compositions of the present invention include, but are not limited to, azomethines, indigoids, thioindigoids, merocyanines, indans, quinophthalonic dyes, perylenes, phthaloperines, triphenodioxazines, indoloquinoxalines, imidazo-triazines, tetrazines, azo and (poly)azo dyes, benzoquinones, naphthoquinones, anthroquinone and (poly)anthroquinones, anthropyrimidinones, iodine, iodates, or combinations of two or more thereof. The dichroic dye can be present in the curable photochromic adhesive compositions of the present invention in any suitable about, such as from 0.001 to 10 percent by weight, or from 0.01 to 5 percent by weight, or from 0.1 to 2.5 percent by weight, the percent weights in each case being based on the total solids weight of the curable photochromic adhesive composition (including the weight of the dichroic dye; and inclusive of the recited values).

The curable photochromic adhesive compositions of the present invention can be applied by any suitable application method so as to form, for example, an applied layer. Application methods by which the curable photochromic adhesive compositions of the present invention can be applied, such as over or onto a substrate, include, but are not limited to, draw-down blade (or bar) application methods; slot-die application methods; spin application methods; curtain application methods; dip application methods; and combinations of such application methods.

The curable photochromic adhesive compositions of the present invention can be cured by any suitable methods. With some further embodiments, the curable photochromic adhesive composition is cured by exposure to elevated temperature (in excess of ambient room temperature). As used herein, by "cured" is meant a three dimensional cross-link network is formed by covalent bond formation, such as between the carbodiimide groups of the polycarbodiimide and the carboxylic acid groups of the carboxylic acid functional material. When cured at elevated temperature, the curable photochromic adhesive composition can be referred to herein as a thermosetting curable photochromic adhesive composition. The temperature at which the thermosetting curable photochromic adhesive composition of the present invention is cured is variable and depends in part on the amount of time during which curing is conducted. With some embodiments, the curable photochromic adhesive composition is cured at an elevated temperature of from 65 degrees Celsius (° C.) to 204° C., or from 70° C. to 177° C., or from 75° C. to 140° C., for a period of 20 to 240 minutes.

A cured photochromic layer, formed from the curable photochromic adhesive compositions of the present invention, can have any suitable thickness, such as from 5 micrometers to 300 micrometers, or from 10 micrometers to 200 micrometers.

As used herein, the term "layer" is inclusive of films and sheets. As used herein, the term "film" means a layer that is not self-supporting, and the term "sheet" means a layer that is self-supporting.

In accordance with the present invention, there is further provided an optical article comprising (A) a substrate; and (B) an adhesive layer over at least a portion of a surface of the substrate, in which the adhesive layer is formed from the curable photochromic adhesive composition of the present invention. The layer, with some embodiments, is a cured layer. The layer can be formed, from the curable photochromic adhesive composition of the present invention, over the substrate, by one or more of the application and curing methods described previously herein.

The optical article, that includes a substrate, and a layer over at least one surface of the substrate (formed from the curable photochromic adhesive composition of the present invention) can, with some embodiments, be selected from a display element, a window, a mirror, a liquid crystal cell element, and an ophthalmic element. Correspondingly, the substrate of the optical article can be selected from displays, windows, mirrors, liquid crystal cell element substrates, and ophthalmic substrates. The substrate can be composed of one or more suitable materials, including, but not limited to, organic materials, such as organic polymeric materials; glasses, such as silica-based glasses; metals; ceramic materials; and combinations thereof.

Non-limiting examples of organic materials that can be used to form the substrate of the optical articles of the present invention, include polymeric materials, for example, homopolymers and copolymers, prepared from the monomers and mixtures of monomers disclosed in U.S. Pat. No. 5,962,617 and in U.S. Pat. No. 5,658,501 from column 15, line 28 to column 16, line 17, the disclosures of which U.S. patents are specifically incorporated herein by reference. For example, such polymeric materials can be thermoplastic or thermoset polymeric materials, can be transparent or optically clear, and can have any refractive index required. Non-limiting examples of such disclosed monomers and polymers include polyol(allyl carbonate) monomers, e.g., allyl diglycol carbonates such as diethylene glycol bis(allyl carbonate), which monomer is sold under the trademark CR-39 by PPG Industries, Inc.; polyurea-polyurethane (polyurea-urethane) polymers, which are prepared, for example, by the reaction of a polyurethane prepolymer and a diamine curing agent, a composition for one such polymer being sold under the trademark TRIVEX by PPG Industries, Inc.; polyol(meth)acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly (ethylene glycol) bismethacrylate monomers; urethane acrylate monomers; poly(ethoxylated bisphenol A dimethacrylate); poly(vinyl acetate); poly(vinyl alcohol); poly(vinyl chloride); poly(vinylidene chloride); polyethylene; polypropylene; polyurethanes; polythiourethanes; thermoplastic polycarbonates, such as the carbonate-linked resin derived from bisphenol A and phosgene, one such material being sold under the trademark LEXAN; polyesters, such as the material sold under the trademark MYLAR; poly(ethylene terephthalate); polyvinyl butyral; poly(methyl methacrylate), such as the material sold under the trademark PLEXIGLAS, and polymers prepared by reacting polyfunctional isocyanates with polythiols or polyepisulfide monomers, either homopolymerized or co- and/or terpolymerized with polythiols, polyisocyanates, polyisothiocyanates and optionally ethylenically unsaturated monomers or halogenated aromatic-containing vinyl monomers. Also contemplated are copolymers of such monomers and blends of the described polymers and copolymers with other polymers, for example, to form block copolymers or interpenetrating network products.

The substrate, with some embodiments, can optionally include a photochromic material and/or a fixed-tint dye, which can each be selected from those classes and examples of photochromic materials and fixed-tint dyes as described previously herein. The optional photochromic material(s)/compound(s) present in the substrate can be the same or different than the photochromic compound(s) of the layer formed from the curable photochromic adhesive composition of the present invention. The optional fixed-tint dye(s) can be the same or different than the optional fixed-tint dye(s) of the layer formed from the curable photochromic adhesive composition of the present invention.

The layer, formed from the curable photochromic adhesive composition of the present invention, can be in the form of a single layer or multiple layers. When in the form of multiple layers, each layer can be prepared from curable photochromic adhesive compositions according to the present invention, having the same or different compositions, such as the same or different photochromic compound(s).

In addition to the photochromic layer, formed from the curable photochromic adhesive composition of the present invention, the optical article can optionally include one or more further layers, including art-recognized layers, such as, but not limited to, a primer layer(s); an adhesive layer(s) prepared from a composition other than the curable photochromic adhesive composition of the present invention; a protective layer(s) (such as a hard-coat layer); a polarizing layer(s); a birefringent layer(s); an antireflective layer(s); a photochromic layer(s) that is prepared from the curable photochromic coating composition of the present invention; and/or another photochromic layer(s) that is prepared from a composition other than the curable photochromic coating composition of the present invention.

With some embodiments, the optical article, that includes a layer formed from the curable photochromic adhesive composition of the present invention, is selected from a corrective lens, a non-corrective lens, a magnifying lens, a protective lens, and a visor.

The adhesive layer, formed from the curable photochromic adhesive composition of the present invention, can be: interposed between a surface of the substrate and an overlying layer; and/or interposed between an underlying layer and an overlying layer.

With some further embodiments, the adhesive layer, formed from the curable photochromic adhesive composition of the present invention, is interposed between a first substrate and a second substrate, and adhesively bonds the first substrate and the second substrate together.

The present invention also relates to a curable photochromic coating composition, as described previously herein.

The curable photochromic coating compositions of the present invention include at least one polycarbodiimide. The polycarbodiimide of the curable photochromic coating compositions of the present invention is as described previously herein with regard to the polycarbodiimide of the curable photochromic adhesive compositions of the present invention.

The curable photochromic coating compositions of the present invention include a first carboxylic acid functional material and a second carboxylic acid functional material, as described previously herein.

The first carboxylic acid functional material of the curable photochromic coating compositions of the present invention includes at least two carboxylic acid groups, and has an acid (carboxylic acid) equivalent weight of greater than or equal to 600 g/mole. The first carboxylic acid functional material of the curable photochromic coating compositions of the present invention is as described previously herein with regard to the carboxylic acid functional material of the curable photochromic adhesive compositions of the present invention.

In accordance with some embodiments, the first carboxylic acid functional material of the curable photochromic coating composition is selected from carboxylic acid functional polyester; carboxylic acid functional polycarbonate; carboxylic acid functional polyether; carboxylic acid functional polyurethane; carboxylic acid functional polyurea; carboxylic acid functional polyamide; carboxylic acid functional poly(siloxane); carboxylic acid salts of each thereof; copolymers thereof; or combinations thereof. The carboxylic acid functional polyester, carboxylic acid functional polycarbonate, carboxylic acid functional polyether, carboxylic acid functional polyurethane, carboxylic acid functional polyurea, carboxylic acid functional polyamide, carboxylic acid functional poly(siloxane), and carboxylic acid salts of each thereof, from which the first carboxylic acid functional material of the curable photochromic coating composition of the present invention can be selected, are each as described previously herein with regard to the curable photochromic adhesive composition.

The second carboxylic acid functional material of the curable photochromic coating compositions of the present invention includes at least three carboxylic acid groups, and has an acid (carboxylic acid) equivalent weight of less than or equal to 580 g/mole.

With some embodiments, the second carboxylic acid functional material, of the curable photochromic coating compositions of the present invention, has an acid (carboxylic acid) equivalent weight of less than or equal to 570 g/mole, or less than or equal to 565 g/mole, or less than or equal to 560 g/mole. With some further embodiments, the second carboxylic acid functional material has an acid equivalent weight of at least 50 g/mole, or at least 55 g/mole, or at least 60 g/mole, or at least 64 g/mole, or at least 70 g/mole. The acid equivalent weight of the second carboxylic acid functional material can range between any combination of these recited upper and lower values, inclusive of the recited values. With some further embodiments, the second carboxylic acid functional material has an acid equivalent weight of from 50 g/mole to 580 g/mole, or from 55 g/mole to 570 g/mole, or from 60 g/mole to 565 g/mole, or from 64 g/mole to 560 g/mole, in each case inclusive of the recited values.

The second carboxylic acid functional material includes, with some embodiments, a carboxylic acid functional polymer having at least three carboxylic acid groups, an Mn of greater than or equal to 2000 g/mole, and an acid equivalent weight of less than or equal to 580 g/mole. With some embodiments, the second carboxylic acid functional material is a carboxylic acid functional polymer having at least three carboxylic acid groups, an Mn of greater than or equal to 2000 g/mole, and an acid equivalent weight of less than or equal to 580 g/mole.

The carboxylic acid functional polymer of the second carboxylic acid functional material has an Mn of greater than or equal to 2000 g/mole, such as at least 2500 g/mole, or at least 3000 g/mole. The carboxylic acid functional polymer of the second carboxylic acid functional material has, with some embodiments, an Mn of less than equal to 50,000 g/mole, or less than equal to 20,000 g/mole, or less than equal to 15,000 g/mole. With some further embodiments, the carboxylic acid functional polymer of the second carboxylic acid functional material has an Mn of from 2000 g/mole to 50,000 g/mole, or from 2500 g/mole to 20,000 g/mole, or from 3000 g/mole to 15,000 g/mol, in each case inclusive of the recited values.

The carboxylic acid functional polymer of the second carboxylic acid functional material has an acid equivalent weight of less than or equal to 580 g/mole, and can have further acid equivalent weight values and ranges selected from those recited above with regard to the second carboxylic acid functional material. With some embodiments, the carboxylic acid functional polymer of the second carboxylic acid functional material has an acid equivalent weight of from 55 g/mole to 580 g/mole, or from 65 g/mole to 575 g/mole, or from 80 g/mole to 570 g/mole, or from 100 g/mole to 570 g/mole, in each case inclusive of the recited values.

The carboxylic acid functional polymer, of the second carboxylic acid functional material, with some embodiments, includes residues (or monomer units) of a carboxylic acid functional ethylenically unsaturated radically polymerizable monomer, such as carboxylic acid functional (meth) acrylate monomer and/or carboxylic acid functional alkene monomer (including carboxylic acid functional vinyl monomer and/or carboxylic acid functional allyl monomer). Examples of carboxylic acid functional ethylenically unsaturated radically polymerizable monomers from which the carboxylic acid functional polymer, of the second carboxylic acid functional material, can be formed, include, but are not limited to, acrylic acid; methacrylic acid; 2-methacryloyloxyethyl succinic acid; 3-butenoic acid; 6-heptenoic acid; 6-methyl 6-heptenoic acid; 2-methyl 6-heptenoic acid; 3-methyl 6-heptenoic acid; 3-ethyl 6-heptenoic acid; 5-methyl 6-heptenoic acid; 4-methyl 6-heptenoic acid; 6-octenoic acid; 2-propyl 6-heptenoic acid; and 2,4-dimethyl 6-heptenoic acid; and combinations of two or more thereof. With some embodiments, the carboxylic acid functional polymer, of the second carboxylic acid functional material, includes residues (or monomer units) of a carboxylic acid functional (meth)acrylate monomer, such as acrylic acid, methacrylic acid, 2-methacryloyloxyethyl succinic acid, and combinations thereof.

With some embodiments, in addition to including residues of a carboxylic acid functional ethylenically unsaturated radically polymerizable monomer, the carboxylic acid functional polymer, of the second carboxylic acid functional material, further includes residues of one or more ethylenically unsaturated radically polymerizable monomers that are free of carboxylic acid functionality (or groups). Classes of ethylenically unsaturated radically polymerizable monomers that are free of carboxylic acid functionality include, but are not limited to, (meth)acrylate monomers that are free of carboxylic acid functionality; alkene monomers (including vinyl monomers and/or allyl monomers) that are free of carboxylic acid functionality; and combinations thereof. Examples of $C_1$-$C_{20}$ (meth)acrylates that are free of carboxylic acid functionality, which can be used in preparing the carboxylic acid functional polymer, of the second carboxylic acid functional material, include, but are not limited to, methyl (meth)acrylate, ethyl (meth)acrylate, propyl (meth) acrylate, isopropyl (meth)acrylate, butyl (meth)acrylate, isobutyl (meth)acrylate, tert-butyl (meth)acrylate, 2-ethylhexyl (meth)acrylate, lauryl (meth)acrylate, isobornyl (meth)acrylate, cyclohexyl (meth)acrylate and 3,3,5-trimethylcyclohexyl (meth)acrylate. Further examples of ethylenically unsaturated radically polymerizable monomers that are free of carboxylic acid functionality include, but are not limited to, styrene; vinyl alcohol; allyl alcohol; vinyl chloride; allyl chloride; acrylonitrile; trimethyl(4-methyl-4-penten-1-yl)-silane; 1-octene; 1-undecene; 1-octadecene; 4-heptenal; 6-methyl-, 9-decen-3-one; 5-methyl 1-heptene; ethenyl cyclopentane; bicyclo[2.2.1]hept-2-ene; ethenyl cyclohexane; 2-propenoic acid, cyclohexyl ester; 2-propenoic acid, bicyclo[2.2.1]hept-2-yl ester; 2-propenoic acid, 4-(1,1-dimethylethyl)cyclohexyl ester; 2-propenoic acid, tricyclo[3.3.1.1$^{3,7}$]dec-2-yl ester; and combinations of two or more thereof.

With some embodiments of the present invention, the second carboxylic acid functional material is selected from (i) a carboxylic acid functional polymer having, at least three carboxylic acid groups, an Mn of greater than or equal to 2000, and an acid equivalent weight of less than or equal to 580 g/mole, as described above; and/or (ii) a carboxylic acid functional material having 3 or 4 carboxylic acid groups, and having an acid equivalent weight of less than or equal to 580 g/mole.

The carboxylic acid functional material having 3 or 4 carboxylic acid groups, and an acid equivalent weight of less than or equal to 580 g/mole, from which the second carboxylic acid functional material can be selected, can have further acid equivalent weight values and ranges selected from those recited above with regard to the second carboxylic acid functional material, such as from 50 g/mole to 580 g/mole, or from 55 g/mole to 570 g/mole, or from 60 g/mole to 565 g/mole, or from 64 g/mole to 560 g/mole, in each case inclusive of the recited values.

Examples of carboxylic acid functional materials having 3 or 4 carboxylic acid groups, and having an acid equivalent weight of less than or equal to 580 g/mole, from which the second carboxylic acid functional material can be selected include, but are not limited to, citric acid; aconitic acid; homoaconitic acid; isocitric acid; homocitric acid; homoisocitric acid; hydroxyl citric acid; benzenehexacarboxylic acid; trimesitic acid; agaric acid; berberonic acid; collidinic acid; fluorocitric acid; oxalosuccinic acid; propane-1,2,3-tricarboxylic acid; 3-carboxy-cis,cis-muconic acid; N-(2-carboxyethyl)iminodiacetic acid; carboxyglutamic acid; pyrroloquinoline quinone; trachyspic acid; cyclopentanetetracarboxylic acid; carboxylic acid functional crown ethers, such as 18-crown-6 tetracarboxylic acid; furantetracarboxylic acid; 3-hexyne-1,1,6,6-tetracarboxylic acid; cyclobutane-1,1,3,3,-tetracarboxylic acid; cyclopentane-1,2,3,4-tetracarboxylic acid; bi(cyclopropane)-2,2'-3,3'-tetracarboxylic acid; bicyclo[2,2,2]oct-7-ene-2,3,5,6-tetracarboxylic acid; tricyclo[4.2.2.0(2,5)]dec-9-ene-3,4,7,8,-tetracarboxylic acid; pentane-1,3,3,5-tetracarboxylic acid; biphenyl-3,3',5,5'-tetracarboxylic acid; 1,2,3,4-butanetetracarboxylic acid, 3,3',5,5'-tetracarboxydiphenylmethane; 1,2,3,4-butanetetracarboxylic acid; 1,2,3,4-cyclobutanetetracarboxylic acid; methanetricarboxylic acid; 1,1,1-ethanetricarboxylic acid; 1,1,2-ethanetricarboxylic acid; 2-hydroxy-1,1,1-ethanetricarboxylic acid; and combinations thereof.

With the curable photochromic coating compositions of the present invention, the first carboxylic acid functional material and the second carboxylic acid functional material together provide a total carboxylic acid equivalents, which is a sum of the acid equivalents weight of the first carboxylic acid functional material, and the acid equivalents weight of the second carboxylic acid functional material.

With some embodiments of the curable photochromic coating compositions of the present invention, the second carboxylic acid functional material provides 40 percent to 90 percent of carboxylic acid equivalents, based on total carboxylic acid equivalents of the first carboxylic acid functional material and the second carboxylic acid functional material. Correspondingly, and in accordance with some further embodiments of the present invention, the first carboxylic acid functional material provides 10 percent to 60 percent of carboxylic acid equivalents, based on total carboxylic acid equivalents of the first carboxylic acid functional material and the second carboxylic acid functional material.

The curable photochromic coating compositions, in accordance with some embodiments of the present invention, have an equivalents ratio of (i) carbodiimide equivalents of the polycarbodiimide to (ii) a total carboxylic acid equivalents of the first carboxylic acid functional material and the second carboxylic acid functional material, that is from 0.5:1 to 3:1. With some further embodiments, the curable photochromic coating compositions have an equivalents ratio of (i) carbodiimide equivalents of the polycarbodiimide to (ii) a total carboxylic acid equivalents of the first carboxylic acid functional material and the second carboxylic acid functional material, that is from 0.5:1 to 3:1, or from 0.5:1 to 2:1, or from 0.9:1 to 2:1, in each case inclusive of the recited ratios.

The curable photochromic coating compositions of the present invention include a photochromic compound, such as one or more photochromic compounds. Each photochromic compound, of the curable photochromic coating compositions, can be selected from known classes and examples of photochromic compounds, and can include combinations or mixtures thereof, including those classes and examples of photochromic compounds as described previously herein with regard to the curable photochromic adhesive compositions of the present invention. The photochromic compound(s) can be present in the curable photochromic coating compositions in a photochromic amount, including those amounts as described previously herein with regard to the curable photochromic adhesive compositions of the present invention.

The curable photochromic coating compositions of the present invention include an aprotic organic solvent, including those classes, examples, and amounts as described previously herein with regard to the curable photochromic adhesive compositions of the present invention.

The curable photochromic coating compositions of the present invention optionally include, with some embodiments, one or more additives, such as, but not limited to, waxes for flow and wetting; flow control agents, such as poly(2-ethylhexyl)acrylate; surface additives, such as polyether modified polydimethylsiloxanes; rheology control agents; leveling agents; antioxidants; light stabilizers, such as hindered amine light stabilizers; ultraviolet (UV) light absorbers; heat stabilizers; singlet oxygen quenchers; fixed-tint dyes; dichroic dyes; adhesion promoters; catalysts; and combinations of two or more thereof. Examples of useful antioxidants, hindered amine light stabilizers, and UV light absorbers include, but are not limited to, those available commercially from BASF under the trademarks IRGANOX and TINUVIN. These optional additives, when used, can be present in amounts up to 20 percent by weight, based on total solids weight of the curable photochromic coating composition (excluding solvent).

The optional additives that can be included in the curable photochromic coating compositions of the present invention, include one or more fixed-tint dyes, including those classes, examples, and amounts as described previously herein with regard to the curable photochromic adhesive compositions of the present invention.

The optional additives that can be included in the curable photochromic coating compositions of the present invention, include one or more dichroic dyes, including those classes, examples, and amounts as described previously herein with regard to the curable photochromic adhesive compositions of the present invention.

The curable photochromic coating compositions of the present invention can be applied by any suitable application method so as to form, for example, an applied layer. Application methods by which the curable photochromic coating compositions of the present invention can be applied, such as over or onto a substrate, include, but are not limited to, spray application methods; dip coating methods; curtain coating methods; draw-down blade (or bar) application methods; spin coating application methods; jet printing methods (such as inkjet printing methods, where the "ink" is replaced with a curable photochromic coating composition according to the present invention); and combinations of two or more such application methods.

The curable photochromic coating compositions of the present invention can be cured by any suitable methods. With some further embodiments, the curable photochromic coating composition is cured by exposure to elevated temperature (in excess of ambient room temperature). As used herein, by "cured" is meant a three dimensional crosslink network is formed by covalent bond formation, such as between the carbodiimide groups of the carbodiimide functional material and the carboxylic acid groups of the first and second carboxylic acid functional materials. When cured at elevated temperature, the curable photochromic coating composition can be referred to herein as a thermosetting curable photochromic coating composition. The temperature at which the thermosetting curable photochromic coating composition of the present invention is cured is variable and depends in part on the amount of time during which curing is conducted. With some embodiments, the curable photochromic coating composition is cured at an elevated temperature of from 65° C. to 204° C., or from 70° C. to 177° C., or from 75° C. to 140° C., for a period of 20 to 240 minutes.

A cured photochromic layer, formed from the curable photochromic coating compositions of the present invention, can have any suitable thickness, such as from 10 micrometers to 100 micrometers, or from 10 micrometers to 75 micrometers.

A cured photochromic layer, formed from the curable photochromic coating composition, with some embodiments of the present invention, has a Fischer microhardness of at least 10 Newtons per millimeter squared ($N/mm^2$), such as from 10 $N/mm^2$ to 85 $N/mm^2$, or from 10 $N/mm^2$ to 51 $N/mm^2$, or from 12 $N/mm^2$ to 50 $N/mm^2$, in each case inclusive of the recited values.

In accordance with the present invention there is further provided an optical article that comprises (A) a substrate; and (B) a layer over at least a portion of a surface of the substrate, in which the layer is formed from the curable photochromic coating composition of the present invention. The layer, with some embodiments, is a cured layer. The layer can be formed, from the curable photochromic coating composition of the present invention, over the substrate, by one or more of the application and curing methods described previously herein.

The optical article, that includes a substrate, and a layer over at least one surface of the substrate (formed from the curable photochromic coating composition of the present invention) can, with some embodiments, be selected from a display element, a window, a mirror, a liquid crystal cell element, and an ophthalmic element. Correspondingly, the substrate of the optical article can be selected from displays, windows, mirrors, liquid crystal cell element substrates, and ophthalmic substrates. The substrate can be composed of one or more suitable materials, including, but not limited to, organic materials, such as organic polymeric materials; glasses, such as silica-based glasses; metals; ceramic materials; and combinations thereof.

Non-limiting examples of organic materials that can be used to form the substrate of the optical articles of the present invention, include those polymeric materials as described previously herein with regard to optical articles including a layer formed from the curable photochromic adhesive compositions of the present invention.

The substrate, with some embodiments, can optionally include a photochromic material and/or a fixed-tint dye, which can each be selected from those classes and examples of photochromic materials and fixed-tint dyes as described previously herein. The optional photochromic material(s)/ compound(s) present in the substrate can be the same or different than the photochromic compound(s) of the layer formed from the curable photochromic coating composition of the present invention. The optional fixed-tint dye(s) can be the same or different than the optional fixed-tint dye(s) of the layer formed from the curable photochromic coating composition of the present invention.

The layer, formed from the curable photochromic coating composition of the present invention, can be in the form of a single layer or multiple layers. When in the form of multiple layers, each layer can be prepared from curable photochromic coating compositions according to the present invention, having the same or different compositions, such as the same or different photochromic compound(s).

In addition to the photochromic layer, formed from the curable photochromic coating composition of the present invention, the optical article can optionally include one or more further layers, including art-recognized layers, such as, but not limited to, a primer layer(s); an adhesive layer(s) prepared from the curable photochromic adhesive composition of the present invention; an adhesive layer(s) prepared from a composition other than the curable photochromic adhesive composition of the present invention; a protective layer(s) (such as a hard-coat layer); a polarizing layer(s); a birefringent layer(s); an antireflective layer(s); and/or another photochromic layer(s) that is prepared from a composition other than the curable photochromic coating composition of the present invention.

With some embodiments, the optical article, that includes a layer formed from the curable photochromic coating composition of the present invention, is selected from a corrective lens, a non-corrective lens, a magnifying lens, a protective lens, and a visor.

The present invention can be further characterized by one or more of the following non-limiting clauses.

Clause 1: A curable photochromic adhesive composition comprising:
(a) a polycarbodiimide;
(b) a carboxylic acid functional material having at least two carboxylic acid groups, and having an acid equivalent weight of greater than or equal to 600 g/mole;
(c) a photochromic compound; and
(d) an aprotic organic solvent,
wherein an equivalents ratio of carbodiimide equivalents of the polycarbodiimide to carboxylic acid equivalents of the carboxylic acid functional material, is from 0.5:1 to 10:1.

Clause 2: The curable photochromic adhesive composition of clause 1, wherein the carboxylic acid functional material is selected from carboxylic acid functional polyester; carboxylic acid functional polycarbonate; carboxylic acid functional polyether; carboxylic acid functional polyurethane; carboxylic acid functional polyurea; carboxylic acid functional polyamide; carboxylic acid functional poly(siloxane); carboxylic acids salts of each thereof; copolymers thereof; or combinations thereof.

Clause 3: The curable photochromic adhesive composition of clauses 1 or 2, wherein the polycarbodiimide has a carbodiimide equivalent weight of at least 250 g/mole, or at least 300 g/mole.

Clause 4: The curable photochromic adhesive composition of any one of clauses 1 to 3, wherein the polycarbodiimide is formed by a reaction comprising condensation of polyfunctional isocyanates, wherein each polyfunctional isocyanate is selected from the group consisting of aliphatic polyfunctional isocyanates, cycloaliphatic polyfunctional isocyanates, heterocycloaliphatic polyfunctional isocyanates, aryl polyfunctional isocyanates, arylaliphatic polyfunctional isocyanates, and combinations of two or more thereof.

Clause 5: The curable photochromic adhesive composition of any one of clauses 1 to 4, further comprising at least one additive selected from flow control agents, surface additives, rheology control agents, leveling agents, antioxidants, light stabilizers, ultraviolet light absorbers, heat stabilizers, singlet oxygen quenchers, fixed-tint dyes, dichroic dyes, adhesion promoters, catalysts, and combinations of two or more thereof.

Clause 6: The curable photochromic adhesive composition of any one of clauses 1 to 5, wherein the carboxylic acid functional material (b) has an acid equivalent weight of from 600 g/mole to 40,000 g/mole, or from 650 g/mole to 40,000 g/mole, or from 700 g/mole to 40,000 g/mole, or from 600 g/mole to 20,000 g/mole, or from 600 g/mole to 10,000 g/mole, in each case inclusive of the recited values.

Clause 7: The curable photochromic adhesive composition of any one of clauses 1 to 6, wherein the carboxylic acid functional material (b) has an Mn of from 1200 g/mole to 80,000 g/mole, or from 1200 to 40,000 g/mole, or from 1200 to 20,000 g/mole, in each case inclusive of the recited values.

Clause 8: An optical article comprising:
a substrate; and
an adhesive layer over at least a portion of a surface of the substrate, wherein the adhesive layer is formed from the curable photochromic adhesive composition of any one of clauses 1 to 7.

Clause 9: The optical article of clause 8, wherein the optical article is selected from a display element, a window, a mirror, a liquid crystal cell element, and an ophthalmic element.

Clause 10: The optical article of clause 9, wherein the ophthalmic element is selected from a corrective lens, a non-corrective lens, a magnifying lens, a protective lens, and a visor.

Clause 11: A curable photochromic coating composition comprising:
(a) a polycarbodiimide;
(b) a first carboxylic acid functional material having at least two carboxylic acid groups, and having an acid equivalent weight of greater than or equal to 600 g/mole;
(c) a second carboxylic acid functional material having at least three carboxylic acid groups, and having an acid equivalent weight of less than or equal to 580 g/mole;
(d) a photochromic compound; and
(e) an aprotic organic solvent,
wherein an equivalents ratio of carbodiimide equivalents of the polycarbodiimide to a total carboxylic acid equivalents of the first carboxylic acid functional material and the second carboxylic acid functional material, is from 0.5:1 to 3:1.

Clause 12: The curable photochromic coating composition of clause 11, wherein the first carboxylic acid functional material is selected from: carboxylic acid functional polyester; carboxylic acid functional polycarbonate; carboxylic acid functional polyether; carboxylic acid functional polyurethane; carboxylic acid functional polyurea; carboxylic acid functional polyamide; carboxylic acid functional poly(siloxane); carboxylic acids salts of each thereof; copolymers thereof; or combinations thereof.

Clause 13: The curable photochromic coating composition of clauses 11 or 12, wherein the second carboxylic acid functional material is selected from (i) a carboxylic acid functional polymer having at least three carboxylic acid groups, an Mn of greater than or equal to 2000 g/mole, and an acid equivalent weight of less than or equal to 580 g/mole; and/or (ii) a carboxylic acid functional material having 3 or 4 carboxylic acid groups, and having an acid equivalent weight of less than or equal to 580 g/mole.

Clause 14: The curable photochromic coating composition of any one of clauses 11 to 13, wherein the second carboxylic acid functional material comprises a carboxylic acid functional polymer having at least three carboxylic acid groups, an Mn of greater than or equal to 2000 g/mole, and an acid equivalent weight of less than or equal to 580 g/mole.

Clause 15: The curable photochromic coating composition of clause 14, wherein the carboxylic acid functional polymer, of the second carboxylic acid functional material, comprises residues of a carboxylic acid functional (meth)acrylate monomer.

Clause 16: The curable photochromic coating composition of any one of clauses 11 to 15, wherein the second carboxylic acid functional material provides 40 percent to 90 percent of carboxylic acid equivalents, based on total carboxylic acid equivalents of the first carboxylic acid functional material and the second carboxylic acid functional material.

Clause 17: The curable photochromic coating composition of any one of clauses 11 to 16, wherein the polycarbodiimide has a carbodiimide equivalent weight of at least 250 g/mole, or at least 300 g/mole.

Clause 18: The curable photochromic coating composition of any one of clauses 11 to 17, wherein the polycarbodiimide is formed by a reaction comprising condensation of polyfunctional isocyanates, wherein each polyfunctional isocyanate is selected from the group consisting of aliphatic polyfunctional isocyanates, cycloaliphatic polyfunctional isocyanates, heterocycloaliphatic polyfunctional isocyanates, aryl polyfunctional isocyanates, arylaliphatic polyfunctional isocyanates, and combinations of two or more thereof.

Clause 19: The curable photochromic coating composition of any one of clauses 11 to 18, wherein a cured layer of the curable photochromic coating composition has, a Fischer microhardness of at least 10 N/mm$^2$.

Clause 20: The curable photochromic coating composition of any one of clauses 11 to 19, further comprising at least one additive selected from flow control agents, surface additives, rheology control agents, leveling agents, antioxidants, light stabilizers, ultraviolet light absorbers, heat stabilizers, singlet oxygen quenchers, fixed-tint dyes, dichroic dyes, adhesion promoters, catalysts, and combinations of two or more thereof.

Clause 21: The curable photochromic coating composition of any one of clauses 11 to 20, wherein the first carboxylic acid functional material has an acid equivalent weight of from 600 g/mole to 40,000 g/mole, or from 650 g/mole to 40,000 g/mole, or from 700 g/mole to 40,000 g/mole, or from 600 g/mole to 20,000 g/mole, or from 600 g/mole to 10,000 g/mole, in each case inclusive of the recited values.

Clause 22: The curable photochromic coating composition of any one of clauses 11 to 21, wherein the first carboxylic acid functional material has an Mn of from 1200 g/mole to 80,000 g/mole, or from 1200 g/mole to 40,000 g/mole, or from 1200 g/mole to 20,000 g/mole, in each case inclusive of the recited values.

Clause 23: The curable photochromic coating composition of any one of clauses 11 to 22, wherein the second carboxylic acid functional material has an acid equivalent weight of from 50 g/mole to 580 g/mole, or from 55 g/mole to 570 g/mole, or from 60 g/mole to 565 g/mole, or from 64 g/mole to 560 g/mole, in each case inclusive of the recited values.

Clause 24: An optical article comprising:
a substrate; and
a layer over at least a portion of a surface of the substrate, wherein the layer is formed from the curable photochromic coating composition of any one of clauses 11 to 23.

Clause 25: The optical article of clause 24, wherein the optical article is selected from a display element, a window, a mirror, a liquid crystal cell element, and an ophthalmic element.

Clause 26: The optical article of clause 25, wherein the ophthalmic element is selected from a corrective lens, a non-corrective lens, a magnifying lens, a protective lens, and a visor.

The present invention is more particularly described in the following examples, which are intended to be illustrative only, since numerous modifications and variations therein will be apparent to those skilled in the art. Unless otherwise specified, all parts and all percentages are by weight.

EXAMPLES

In Part 1 of the following examples, the syntheses of formulation components is provided. In Part 2 there are provided descriptions of the preparation of, photochromic adhesive compositions according to the present invention, photochromic coating compositions according to the present invention, and a comparative photochromic coating composition. In Part 3 there are provided descriptions of the preparation of, multilayer photochromic adhesive test specimens made using photochromic adhesive compositions of Part 2, and photochromic coating test specimens made using photochromic coating compositions of Part 2. In Part 4 there are provided evaluations of the properties of the test specimens prepared in Part 3.

Part 1: Preparation of Formulation Components.

Example 1

A poly(caprolactone) tetra-acid material was prepared as follows.

Step-1: Preparation of Poly(Caprolactone) Tetraol

Pentaerythritol (6 g) and ε-caprolactone (126 g) were combined in a three-necked flask under nitrogen, and heated to 150° C. until homogeneous. Tin (II) octanoate (1 g) was added over 5 minutes resulting in an exotherm to 180° C. The flask was evacuated and purged with nitrogen three times, then stirred for 24 hours at 150° C. under nitrogen. To the cooled reaction mixture was added hexanes (3×300 milliliter (mL)), decanting the supernatant after each addition. The resulting viscous liquid was dried at 40° C. under vacuum to give a low melting white solid (yield: 107 g), which was carried on to step 2.

Step-2: Preparation of Poly(Caprolactone) Tetra-Acid

To a one-neck round bottom flask, containing product of step-1(107 g) and succinic anhydride (18.1 g), was added toluene (250 mL) and triethylamine ("Et₃N," 5.0 mL). The suspension was heated to 80° C. and stirred for 16 hours or overnight. The reaction mixture was cooled down and poured into hexanes (0.5 L) over 5 minutes while stirring. The resulting solution was allowed to cool to room temperature and left to stand for an hour. The top layer hexanes was decanted and the crude product dried under vacuum for 4 hours to give a low melting white solid (yield 125 g). ¹H NMR data confirmed the structure from which was determined a number average molecular weight (Mn) of 2954 g/mole. Based on this, the product was further determined to have an acid equivalent weight of 738.5 g/mole.

Example 2

Poly(Caprolactone) Diacid Material was Prepared as Follows.

To a round bottom flask were added: 100 g of a poly (caprolactone) diol having a reported Mn of about 2000 g/mole available from Millipore Sigma; 10.51 g of succinic anhydride; 250 mL of toluene; and 5 mL of triethylamine. The mixture was heated to 80° C. for 16 hours, and then cooled to room temperature. To the cooled mixture was added 250 mL of hexanes with stirring, resulting in the formation of a precipitate. The liquid was decanted. The retained precipitate was dissolved in 450 mL of ethyl acetate, washed twice with 50 mL of 1N HCl, washed twice with 50 mL of brine, and concentrated under vacuum. The concentrated material was dissolved in 250 mL of ethyl acetate, washed twice with 50 mL of deionized water, and then concentrated on a rotary evaporator. Twice 2-propanol was mixed in and the material concentrated again. The material was then dried overnight under vacuum to give 91.1 g of a white solid. ¹H NMR data was used to confirm conversion of the poly(caprolactone)diol to a diacid and determine an Mn of about 2633 g/mole and an acid equivalent weight of 1316.5 g/mole for the isolated product.

Example 3

A UH-100D Polycarbonate Di-Acid was Prepared as Follows.

Example 3 was conducted in accordance with Step-2 of Example 1 using the following reagents: UH-100D polycarbonate diol (100 g); succinic anhydride (25 g); Et₃N (5 ml); and Toluene (250 ml). After recovery from the mixture with hexanes, the product was re-dissolved in dichloromethane (DCM) and washed twice with aqueous 1N HCl, twice with brine, dried over anhydrous MgSO₄, and filtered through a short pad of celite. A concentration step yielded a low melting white solid (120 g). Based on the acid value, the product was determined to have an acid equivalent weight of 621 g/mole.

Example 4

A PH-300D Polycarbonate Diacid was Prepared as Follows.

To a round bottom flask were added 90 g of PH-300D, a polycarbonate diol available from UBE, 6.30 g of succinic anhydride, 250 mL of toluene, and 5 mL of triethylamine. The mixture was heated to 80° C. for 16 hours. To the cooled mixture was added 250 mL of hexanes with stirring. After settling with stirring stopped, the top layer was decanted. Another 250 mL of hexanes was added with stirring. The solution was allowed to settle again and the top layer decanted. Next, the retained bottom layer was diluted with 250 mL of ethyl acetate, washed twice with 50 mL of 1N HCl, washed twice with 50 mL of water, and then concentrated on a rotary evaporator. 2-propanol was mixed in and the material concentrated again. The material was then dried under vacuum at about 50-60° C. until near constant weight was achieved to give 88.5 g of a viscous clear liquid. $^1$H NMR data confirmed diacid product formation. Based on the measured acidalue, the Mn was determined to be about 3364 g/mole and the acid equivalent weight to be about 1682 g/mole.

Example 5

A Di(Trimethylolpropane) Tetra-Acid Material was Prepared as Follows.

To a round bottom flask were added 25.03 g of di(trimethylolpropane), 42.03 g of succinic anhydride, 250 mL of toluene, and 5 mL of Et$_3$N. The mixture was heated to 80° C. for 16 hours. To the cooled mixture was added 350 mL of ethyl acetate and 150 mL of 1N HCl. After mixing and settling, the aqueous layer was discarded. The organic layer was washed with an additional 150 mL of 1N HCl, and then twice with 150 mL of deionized water. The organic layer was then concentrated on a rotary evaporator. The concentrated low melting solids were dried under vacuum at about 60° C. for 6 hours (Yield 67 g with some residual solvent). Based on structural determination via $^1$H NMR, the di(trimethylolpropane) tetra-acid compound was determined to have an acid equivalent weight of 162.66 g/mole.

Example 6 an Acrylic Poly(Acid) Material was Prepared as Follows.

Dipropylene glycol methyl ether acetate (DPMA; 65 g) was sparged with nitrogen for 15 minutes, then heated to 125° C. A solution of 2-methacryloyloxyethyl succinic acid (80.9 g), n-butyl methacrylate (50 g), 2,2'-azobis(2-methylbutyronitrile) (7.8 g), triphenylphosphite (0.65 g) and t-dodecylmercaptan (1.30 g), was added dropwise over 30 minutes. After stirring for 30 min, 0.3 g of 2,2'-Azobis(2-methylbutyronitrile) in 5 ml of DPMA was added and the solution stirred for another 30 minutes. The solution was then cooled to 50° C. and slowly added to hexanes (0.5 L) with stirring. The combined solution was cooled to room temperature. The solvent was decanted to yield a viscous liquid. The crude solid product was dried under vacuum at 50° C. for 3 hours. Yield: 140 g. The weight average molecular weight (Mw) was 10,800 g/mole and the number average molecular weight (Mn) was 4800 g/mole as determined by GPC using tetrahydrofuran eluent and relative to polystyrene standards. The calculated acid equivalent weight was 559 g/mole based on acid value.

Part-2

Part 2a: Preparation of Photochromic Adhesive Compositions.

Examples 7-10

Photochromic Composition A was prepared using the materials listed in Table 1, which were combined (in the order as listed) and stirred at room temperature at 200 rpm for at least 30 minutes until all the materials dissolved.

TABLE 1

| Photochromic Composition A | |
|---|---|
| Material | Parts by Weight |
| Photochromic Dyes[1] | 1.1663 |
| TINUVIN ® 144[2] | 0.5842 |
| IRGANOX ® 245[3] | 0.5830 |
| Ethyl Acetate | 26.84 |

[1]A blend of photochromic indenonaphthopyran dyes formulated to provide a grey color on activation.
[2]A hindered amine light stabilizer (HALS), commercially available from BASF.
[3]An antioxidant commercially available from BASF.

Photochromic adhesive compositions were prepared using the components listed in Table 2. For each composition, the components of Charge 1 were combined and stirred at room temperature at 60 rpm for 3.5 hrs. The components of Charge 2 were combined in a separate vessel and stirred at room temperature at 60 rpm for 3.5 hrs. Charge 1 and Charge 2 were then combined and stirred at room temperature at 60 rpm for five minutes. The photochromic adhesive compositions were then promptly used as described in Part 3b.

TABLE 2

| Photochromic Adhesive Compositions | | | | |
|---|---|---|---|---|
| | Ex. 7 | Ex. 8 | Ex. 9 | Ex. 10 |
| Charge 1 | | | | |
| Photochromic Composition A | 6.2457 | 6.2415 | 6.2478 | 6.2533 |
| Diacid of Example 3 | 4.08 | | | |
| Diacid of Example 4 | | 5.20 | | |
| Tetraacid of Example 1 | | | 4.28 | |
| Diacid of Example 2 | | | | 4.97 |
| Charge 2 | | | | |
| Ethyl Acetate | 2.5045 | 2.5030 | 2.5023 | 2.5031 |
| Carbodilite V04-K[4] | 2.12 | 1.07 | 1.96 | 1.25 |

[4]A poly(carbodiimide) having an equivalent weight of 333 g/mole, available from Nisshinbo.

Part 2b: Preparation of Photochromic Coating Compositions.

Examples 11-16

Photochromic coating compositions according to the present invention, using poly(carbodiimide)-functional crosslinker, were prepared using the components listed in Table 3 (all components are listed in parts per weight). For each coating composition shown in Table 3, the components of Charge 1 were combined and heated to 50° C. for a minimum of 30 minutes, or until the solids dissolved.

Charge 2 was added, and stirring was continued at 50° C. for 1 hour or until the solids dissolved. The solution was cooled to room temperature followed by the addition of Charge 3. The mixture was stirred for 5 minutes at room temperature, resulting in the formation of photochromic coating compositions, which were promptly applied as described in Part 3b. All compositions were formulated to 58% theoretical solids.

Part-3

Part 3a: Preparation of Multilayer Photochromic Adhesive Test Specimens.

The photochromic adhesive compositions of Examples 7 to 10 were each applied by drawdown technique to separate clear polyester sheets (available from Transcendia, Inc.)

TABLE 3

Photochromic Coating Compositions

| | Ex. 11 | Ex. 12 | Ex. 13 | Ex. 14 | Ex. 15 | Ex. 16 |
|---|---|---|---|---|---|---|
| Charge 1 | | | | | | |
| Photochromic dyes[1] | 9.00 | 9.00 | 9.00 | 9.00 | 9.00 | 9.00 |
| TINUVIN ® 144 | 2.00 | 2.00 | 2.00 | 2.00 | 2.00 | 2.00 |
| IRGANOX ® 245 | 2.00 | 2.00 | 2.00 | 2.00 | 2.00 | 2.00 |
| (3-Glycidoxypropyl) trimethoxysilane | 4.50 | 4.50 | 4.50 | 4.50 | 4.50 | 4.50 |
| BYK ® 333[5] | 0.08 | 0.08 | 0.08 | 0.08 | 0.08 | 0.08 |
| N-methyl-2-pyrrolidone | 85.1 | 85.1 | 85.1 | 85.1 | 85.1 | 85.1 |
| Charge 2 | | | | | | |
| Tetra-acid of Example 1 | — | 37.6 | — | 29.5 | — | — |
| Diacid of Example 3 | 33.6 | — | 26.0 | — | 31.2 | 13.5 |
| Tetra-acid of Example 5 | — | — | — | — | 8.2 | — |
| Acrylic poly(acid) of Example 6 | 30.1 | 28.4 | 23.6 | 22.4 | — | 49.5 |
| Charge 3 | | | | | | |
| CARBODILITE V-04K | 36.3 | 34.1 | — | — | — | 36.9 |
| CARBODILITE V-02B[6] | — | — | 50.4 | 48.1 | 60.5 | — |

[1]A blend of photochromic indenonaphthopyran dyes formulated to provide a grey color on activation.
[5]A polyether modified dimethylpolysiloxane copolymer, available from BYK-Chemie.
[6]A poly(carbodiimide) having an equivalent weight of 600 g/mole, available from Nisshinbo.

Comparative Example CE17

A comparative photochromic coating composition, Comparative Example CE17, was prepared as described for Examples 11 through 16, using an equimolar amount of a second carboxylic acid functional material (i.e., the acrylic poly(acid) prepared as described in Example 6 previously herein), and carbodiimide-functional crosslinker. Formulation details are provided in Table 4.

TABLE 4

Comparative Photochromic Coating Composition

| | CE17 |
|---|---|
| Charge 1 | |
| Photochromic dyes[1] | 9.00 |
| TINUVIN ® 144[2] | 2.00 |
| IRGANOX ® 245[3] | 2.00 |
| (3-Glycidoxypropyl) trimethoxysilane | 4.50 |
| BYK ® 333[5] | 0.08 |
| N-methyl-2-pyrrolidone | 85.1 |
| Charge 2 | |
| UH-100D diacid of Example 3 | — |
| Acrylic poly(acid) of Example 6 | 62.7 |
| Charge 3 | |
| CARBODILITE V-04K[4] | 37.3 |
| CARBODILITE V-02B[6] | — | using the 10 mil (254 micrometer) gap of a square metal drawdown applicator having a three inch (7.6 cm) coating width, which resulted in the formation of intermediate adhesive layered polyester sheets. After application, the intermediate adhesive layered polyester sheets were left to rest for thirty minutes at room temperature. Next, the intermediate adhesive layered polyester sheets were placed in a forced air oven at 100° C. for thirty minutes. Next, a sheet of clear polyester (from Transcendia, Inc.) was laid over and adhered to the adhesive layer of each intermediate adhesive layered polyester sheet using a four inch wide benchtop rubber roller from Speedball (item model number 4121), which resulted in the formation of three-layer intermediate specimens. Each three-layer intermediate specimen was then placed in a forced air oven at 100° C. for thirty minutes between two thin metal sheets, followed by cooling to room temperature, which resulted in the formation of cured three-layer specimens. The cured three-layer specimens were cut into 2 inch by 2 inch (5.1 cm×5.1 cm) multilayer photochromic adhesive test specimens, for evaluation of photochromic performance as described below.

Part 3b: Preparation of Photochromic Coating Test Specimens

The compositions of Examples 11 to 16 and Comparative Example CE17 were applied to PDQ® coated Gentex® polycarbonate plano lenses, each having a diameter of 76 millimeters. Prior to coating, each lens was treated with corona using Tantec equipment with 70 KV and 1000 W settings. About 1-2 mL of each composition was dispensed onto the corona treated plano lenses and then rotated for eight seconds at a spin speed sufficient to deposit 0.3-0.35 g of wet coating composition (58% solids) onto the plano lenses (for examples 11 through 16 and comparative example CE17).

The test specimens of Examples 11 to 16 and Comparative Example CE17 were prepared in duplicate and then cured at 100° C. in a forced air oven for one hour.

Part-4

Part 4a. Photochromic Performance Testing of Multilayer Photochromic Adhesive Test Specimens.

The photochromic performance of the multilayer photochromic adhesive test specimens, prepared as described in Part 3a, was measured on an Advanced Bench for Measuring Photochromics ("A-BMP") optical bench. The multilayer photochromic adhesive test specimens were first exposed to light having a maximum intensity near 365 nanometers (nm) for five minutes at a distance of 10 cm. The integrated UVA irradiance of this light was measured to be 7.7 watts per square meter using a Goosch & Housego OL 756 spectroradiometer with an OL 86-T cosine receptor. Next the multilayer photochromic adhesive test specimens were heated to 70° C. and maintained at that temperature while exposing the test specimens to an F17T8 yellow fluorescent light for 25 minutes at a distance of 10 centimeters (cm) to deactivate the photochromic materials. The irradiance of the fluorescent light at the test specimens was measured with an OL 756 to be 9 Klux. The multilayer photochromic adhesive test specimens were then kept in a dark environment at 21 to 24° C. for a minimum of one hour prior to testing on the optical bench.

The optical bench was equipped with two 150 watt (W) Newport model #66902 xenon arc lamps at right angles to each other with associated Newport 69907 digital controllers. The first lamp was directed through a 3 mm SCHOTT KG-2 band-pass filter and appropriate neutral density filters to obtain the required ultraviolet and visible light spectra. The second lamp was directed through a 3 mm SCHOTT KG-2 band-pass filter, a SCHOTT GG400 short band cutoff filter, and appropriate neutral density filters to provide supplemental visible light. A 2 inch by 2 inch (5.1 cm×5.1 cm) 50% polka dot beam splitter was placed at a 45° angle with respect to each lamp to mix the two beams. The intensity of the beams was adjusted with neutral density filters and the voltage of the xenon arc lamps. Proprietary software, PTSoft version 5.3, was used to control timing, irradiance, air cell and sample temperature, shuttering, filter selection, and the response measurement. The optical bench was maintained at 23° C. during testing. The combined beam from the xenon arc lamps, used to activate the test specimens, was adjusted to 6.7 watts per square meter UVA integrated over 315-380 nm and 50 Klux illuminance integrated over 380-780 nm. The sample cell was fitted with a quartz window and the specimens centered within the holder. The temperature in the cell was controlled through the proprietary software with an AirJet XE custom-coupled to a bubbling water bath in order to deliver 50% relative humidity air at 23±0.1° C. The photochromic response of the test specimen was measured by a ZEISS® model MCS 601 spectrophotometer with a fiber optic cable used for light delivery from a tungsten halogen lamp. The collimated beam from the lamp was positioned perpendicular to the test specimen such that it passed through the sample and into a receiving fiber optic cable attached to the spectrophotometer. The activating beam from the xenon arc lamps was incident on the test specimen at an angle of 30° and positioned such that it overlapped the monitoring light to form two concentric circles.

The initial unactivated transmittance was measured with the shutter for the xenon arc lamps closed. The shutters were then opened and changes monitors at selected intervals. Changes in the optical density (OD) of the test specimens were determined using the formula:

$$\Delta OD = \log_{10}(T_b/T_a),$$

where $T_b$ is the percent transmittance in the bleached state and $T_a$ is the percent transmittance in the activated state. The ΔOD measurements were based on photopic optical density. For the test, shutters for the activating light were opened for 15 minutes and then closed in order to observe the activation and deactivation of the multilayer photochromic adhesive test specimens. The $T_{1/2}$ is the time in seconds for the ΔOD to reach half the activated ΔOD values once the shutter is closed after the 15 minute activation. If the $T_{1/2}$ time was between two recorded data points, the value was determined by linear interpolation between the nearest data point on each side of the $T_{1/2}$ time.

Part 4b. Photochromic Performance Testing of Photochromic Coating Test Specimens.

One set of test specimens from Examples 11 to 16 and comparative example CE17 were further treated with corona as previously described and spin coated with a protective coating according to the formulation as described in Table 1 of Example 1 in U.S. Pat. No. 7,410,691. The test specimens were cured under a nitrogen atmosphere with UV light from D bulbs. Following this, each test specimen was thermally cured at 105° C. for three hours. The photochromic performance of the test specimens was then tested on the Bench for Measuring Photochromics ("BMP") made by Essilor, Ltd. France as described above in part 4a for the multilayer photochromic adhesive test specimens.

Part 4c: Micro-Hardness Testing of Photochromic Coating Test Specimens.

The second set of test specimens from Examples 11 to 16 and comparative example CE17 were subjected to an additional thermal cure for three hours at 105° C. and the hardness was measured using a Fischerscope HCV, Model H100SMC available from Fischer Technology, Inc. Microhardness was measured at a penetration depth of 2 microns after a 100 milliNewton load for 15 seconds. Each test specimen was measured at least twice and the resulting data was averaged and recorded in Table 6.

Part 4d. Photochromic Performance Test Results for Multilayer Photochromic Adhesive Test Specimens.

The results of the photochromic performance testing of the multilayer photochromic adhesive test specimens are summarized in Table 5.

TABLE 5

| Adhesive Composition | ΔOD after 15 min. activation | $T_{1/2}$ (seconds) |
|---|---|---|
| Example 7 | 0.76 | 31 |
| Example 8 | 0.72 | 27 |
| Example 9 | 0.76 | 29 |
| Example 10 | 0.76 | 27 |

All the photochromic adhesive compositions provided good activated darkness of 0.72 to 0.76 ΔOD after fifteen minutes of activation. All the photochromic adhesive compositions also provided fast fade rates with $T_{1/2}$ values of 27 to 31 seconds.

Part 4e. Test Results for Photochromic Coating Test Specimens.

The results of the micro-hardness and photochromic performance for the photochromic coating test specimens are summarized in Table 6.

TABLE 6

| Example | Fischer micro-hardness (N/mm$^2$) | ΔOD after 15 min. activation | $T_{1/2}$ (seconds) |
|---|---|---|---|
| 11 | 28 | 0.73 | 75 |
| 12 | 21 | 0.74 | 61 |
| 13 | 15 | 0.72 | 75 |
| 14 | 12 | 0.73 | 74 |
| 15 | 13 | 0.71 | 66 |
| 16 | 46 | 0.77 | 116 |
| CE17 | 85 | 0.76 | 304 |

As shown in Table 6, the photochromic coating compositions according to the present invention having both first and second carboxylic acid cross-linkers (Examples 11 through 16) exhibited good photochromic performance in combination with acceptable hardness. In contrast, the comparative photochromic coating composition (CE17), which did not include a carboxylic acid functional material having an acid equivalent weight of greater than or equal to 600 g/mole of the present invention, provided a very hard film, but very slow fade rate. The photochromic adhesive compositions of Examples 7 through 10 (compositions having only the carboxylic acid functional material having an acid equivalent weight of greater than or equal to 600 g/mole) were too soft to be evaluated as coatings.

The present invention has been described with reference to specific details of particular embodiments thereof. It is not intended that such details be regarded as limitations upon the scope of the invention except insofar as and to the extent that they are included in the accompanying claims.

What is claimed is:

1. A curable photochromic adhesive composition comprising:
    (a) a polycarbodiimide;
    (b) a carboxylic acid functional material having at least from two to six carboxylic acid groups, and having an acid equivalent weight of greater than or equal to 600 g/mole;
    (c) a photochromic compound; and
    (d) an aprotic organic solvent,
    wherein an equivalents ratio of carbodiimide equivalents of said polycarbodiimide to carboxylic acid equivalents of said carboxylic acid functional material, is from 0.5:1 to 10:1.

2. The curable photochromic adhesive composition of claim 1, wherein said carboxylic acid functional material is selected from,
    carboxylic acid functional polyester,
    carboxylic acid functional polycarbonate,
    carboxylic acid functional polyether,
    carboxylic acid functional polyurethane,
    carboxylic acid functional polyurea,
    carboxylic acid functional polyamide,
    carboxylic acid functional poly (siloxane),
    carboxylic acids salts of each thereof,
    copolymers thereof, or
    combinations thereof.

3. The curable photochromic adhesive composition of claim 1, wherein said polycarbodiimide has a carbodiimide equivalent weight of at least 250 g/mole.

4. The curable photochromic adhesive composition of claim 1, wherein said polycarbodiimide is formed by a reaction comprising condensation of polyfunctional isocyanates, wherein each polyfunctional isocyanate is selected from the group consisting of aliphatic polyfunctional isocyanates, cycloaliphatic polyfunctional isocyanates, heterocycloaliphatic polyfunctional isocyanates, aryl polyfunctional isocyanates, arylaliphatic polyfunctional isocyanates, and combinations of two or more thereof.

5. An optical article comprising:
    a substrate; and
    an adhesive layer over at least a portion of a surface of said substrate, wherein said adhesive layer is formed from said curable photochromic adhesive composition of claim 1.

6. A curable photochromic coating composition comprising:
    (a) a polycarbodiimide;
    (b) a first carboxylic acid functional material having at least two carboxylic acid groups, and having an acid equivalent weight of greater than or equal to 600 g/mole;
    (c) a second carboxylic acid functional material having at least three carboxylic acid groups, and having an acid equivalent weight of less than or equal to 580 g/mole;
    (d) a photochromic compound; and
    (e) an aprotic organic solvent,
    wherein an equivalents ratio of carbodiimide equivalents of said polycarbodiimide to a total carboxylic acid equivalents of said first carboxylic acid functional material and said second carboxylic acid functional material, is from 0.5:1 to 3:1.

7. The curable photochromic coating composition of claim 6, wherein said first carboxylic acid functional material is selected from,
    carboxylic acid functional polyester,
    carboxylic acid functional polycarbonate,
    carboxylic acid functional polyether,
    carboxylic acid functional polyurethane,
    carboxylic acid functional polyurea,
    carboxylic acid functional polyamide,
    carboxylic acid functional poly (siloxane),
    carboxylic acids salts of each thereof,
    copolymers thereof, or
    combinations thereof.

8. The curable photochromic coating composition of claim 6, wherein said second carboxylic acid functional material comprises a carboxylic acid functional polymer having at least three carboxylic acid groups, an Mn of greater than or equal to 2000 g/mole, and an acid equivalent weight of less than or equal to 580 g/mole.

9. The curable photochromic coating composition of claim 8, wherein said carboxylic acid functional polymer, of said second carboxylic acid functional material, comprises residues of a carboxylic acid functional (meth) acrylate monomer.

10. The curable photochromic coating composition of claim 6, wherein said second carboxylic acid functional material provides 40 percent to 90 percent of carboxylic acid equivalents, based on total carboxylic acid equivalents of said first carboxylic acid functional material and said second carboxylic acid functional material.

11. The curable photochromic coating composition of claim 6, wherein said polycarbodiimide has a carbodiimide equivalent weight of at least 250 g/mole.

12. The curable photochromic coating composition of claim 6, wherein said polycarbodiimide is formed by a reaction comprising condensation of polyfunctional isocyanates, wherein each polyfunctional isocyanate is selected from the group consisting of aliphatic polyfunctional isocyanates, cycloaliphatic polyfunctional isocyanates, heterocycloaliphatic polyfunctional isocyanates, aryl polyfunctional isocyanates, arylaliphatic polyfunctional isocyanates, and combinations of two or more thereof.

13. The curable photochromic coating composition of claim 6, wherein a cured layer of said curable photochromic coating composition has a Fischer microhardness of at least 10 N/mm$^2$.

14. An optical article comprising:
   a substrate; and
   a layer over at least a portion of a surface of said substrate, wherein said layer is formed from said curable photochromic coating composition of claim 6.

15. The optical article of claim 14, wherein said optical article is selected from a display element, a window, a mirror, a liquid crystal cell element, and an ophthalmic element.

* * * * *